(12) United States Patent
Funahashi et al.

(10) Patent No.: US 6,321,383 B1
(45) Date of Patent: *Nov. 20, 2001

(54) INFORMATION SUPPLYING DEVICE THAT CAN STORE MULTIPLE TYPES OF INFORMATION AND SUPPLIES COMPOSITE INFORMATION IN RESPONSE TO A REQUEST

(75) Inventors: Yasuhiro Funahashi; Takuma Kuno, both of Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 08/688,295

(22) Filed: Jul. 29, 1996

(30) Foreign Application Priority Data

Jul. 31, 1995 (JP) .................................................. 7-195332
Jul. 31, 1995 (JP) .................................................. 7-195333

(51) Int. Cl.[7] ...................................................... H04N 7/173
(52) U.S. Cl. ............................ 725/92; 725/98; 434/307 A
(58) Field of Search ................................. 348/7, 13, 12; 725/82, 91, 92, 93, 98, 114, 115, 116, 118, 145, 144, 147, 148; 434/307 A; H04N 7/173

(56) References Cited

U.S. PATENT DOCUMENTS 5,539,449 * 7/1996 Blahut et al. ............................ 348/7
5,550,863 * 8/1996 Yurt et al. ................................. 348/7
5,570,126 * 10/1996 Blahut et al. ............................. 348/7
5,810,603 * 9/1998 Kato et al. ................................ 348/7
5,838,678 * 11/1998 Davis et al. ......................... 370/389
6,022,223 * 2/2000 Taniguchi et al. ................ 434/307 A

FOREIGN PATENT DOCUMENTS

2271461 * 3/1994 (GB) .

OTHER PUBLICATIONS

Ramanathan et al., "Towards Personalized Multimedia Dial-Up Services", 8213 Computer Networks and ISDN Systems No. 10, Amsterdam, NL, Jul. 1984.*

* cited by examiner

Primary Examiner—David E. Harvey
(74) Attorney, Agent, or Firm—Oliff & Berridge, PLC

(57) ABSTRACT

The first auxiliary memory 11a stores background image information in the form of digital data, and the second auxiliary memory 11b stores sound information in the form of digital data. When a request is transmitted from the terminal 36 to the information supplying device 28, a background image information of a genre, to which the requested song belongs, is retrieved from the first auxiliary memory 11a, packetized by the video packetizer 5, and outputted to the multiplexer 9. A sound information for the requested song is retrieved from the second auxiliary memory 11b, packetized by the audio packetizer 6, and outputted to the multiplexer 9. The background image information and the sound information are combined into a single packet data train and outputted to the terminal 36.

27 Claims, 15 Drawing Sheets

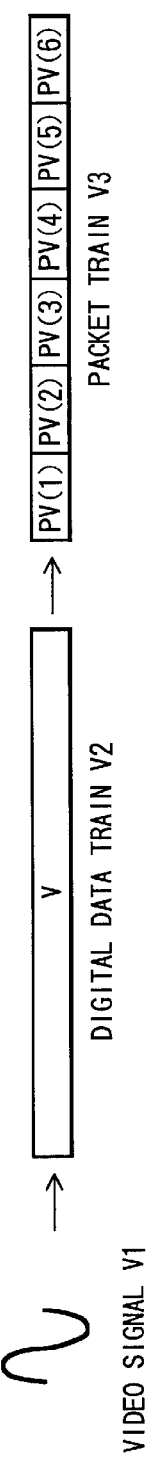
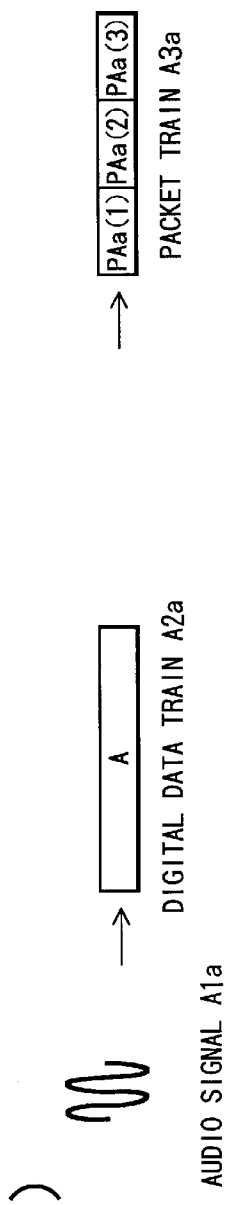
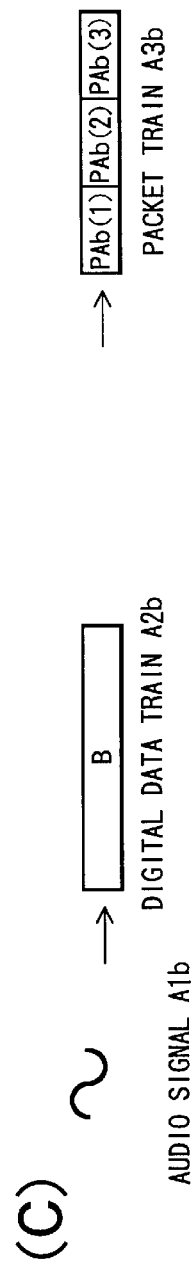
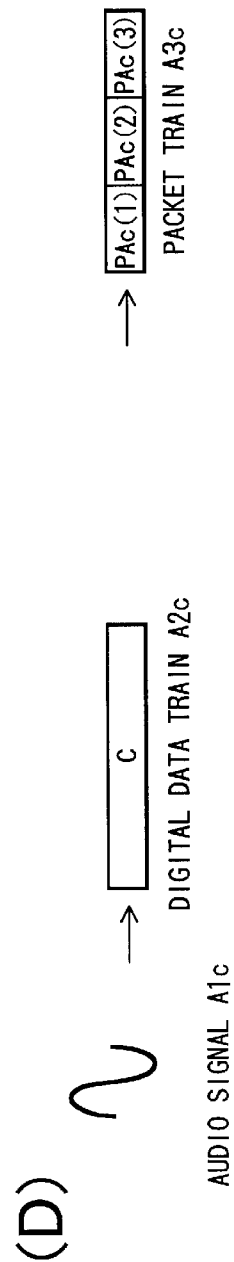
FIG. 4 (A), FIG. 4 (B), FIG. 4 (C), FIG. 4 (D)

FIG. 5 (A)

| PV(1) | PV(2) | PAa(1) | PV(3) | PV(4) | PAa(2) | PV(5) | PV(6) | PAa(3) | DATA TRAIN VAa |

FIG. 5 (B)

| PV(1) | PV(2) | PAb(1) | PV(3) | PV(4) | PAb(2) | PV(5) | PV(6) | PAb(3) | DATA TRAIN VAb |

FIG. 5 (C)

| PV(1) | PV(2) | PAc(1) | PV(3) | PV(4) | PAc(2) | PV(5) | PV(6) | PAc(3) | DATA TRAIN VAc |

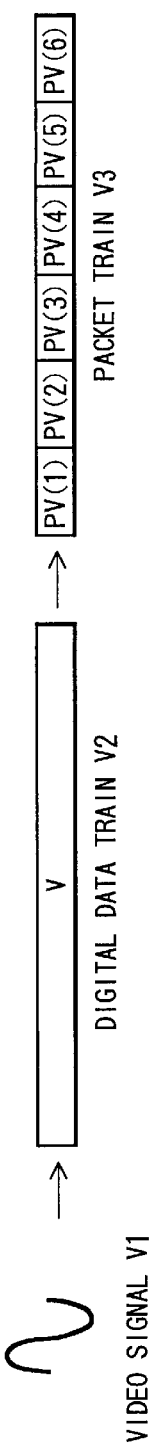
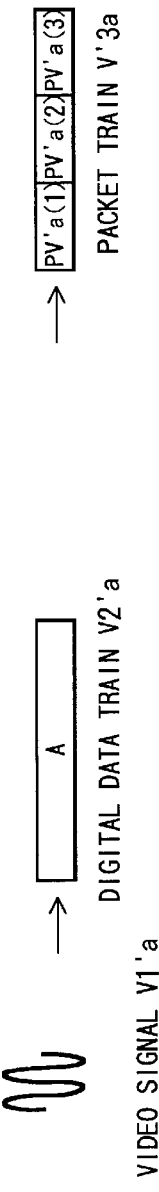
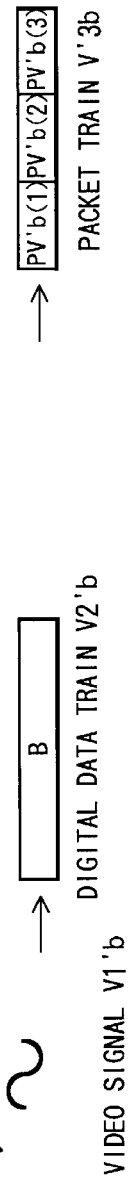
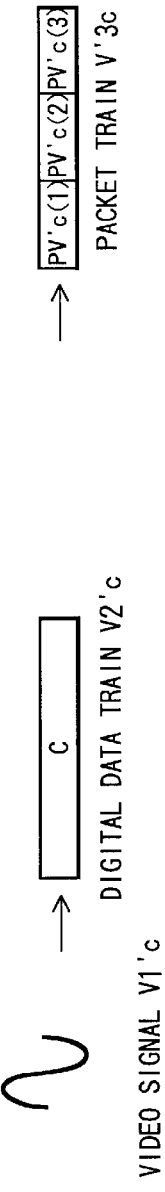
FIG. 12 (A), FIG. 12 (B), FIG. 12 (C), FIG. 12 (D)

FIG. 13 (A)

| PV(1) | PV(2) | PV'a(1) | PV(3) | PV(4) | PV'a(2) | PV(5) | PV(6) | PV'a(3) |

DATA TRAIN VV'a

FIG. 13 (B)

| PV(1) | PV(2) | PV'b(1) | PV(3) | PV(4) | PV'b(2) | PV(5) | PV(6) | PV'b(3) |

DATA TRAIN VV'b

FIG. 13 (C)

| PV(1) | PV(2) | PV'c(1) | PV(3) | PV(4) | PV'c(2) | PV(5) | PV(6) | PV'c(3) |

DATA TRAIN VV'c

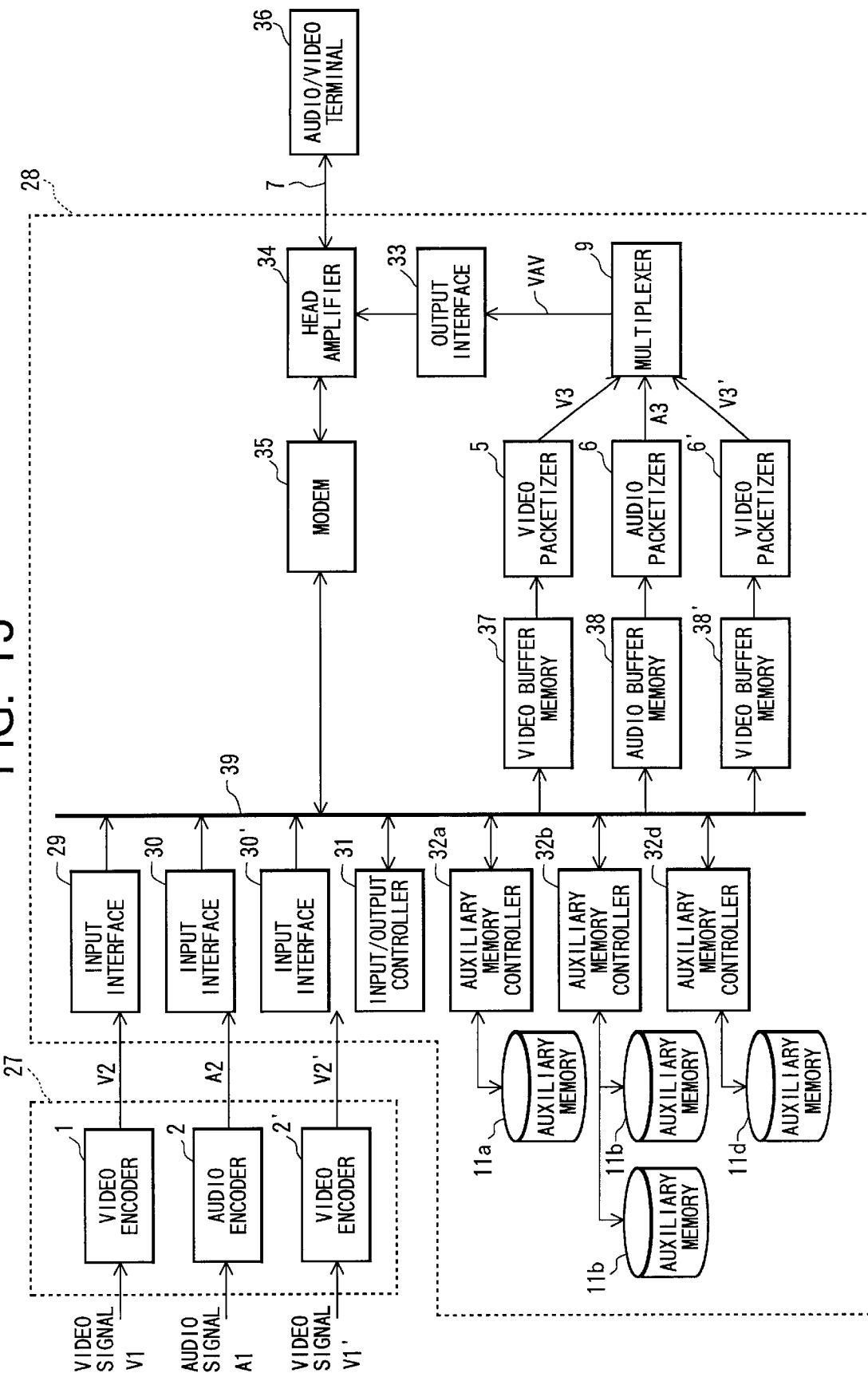

INFORMATION SUPPLYING DEVICE THAT CAN STORE MULTIPLE TYPES OF INFORMATION AND SUPPLIES COMPOSITE INFORMATION IN RESPONSE TO A REQUEST

BACKGROUND OF THE INVENTION

1. Field of the Invention

The present invention relates to an information supplying device for supplying several kinds of information to an information output device.

2. Description of the Related Art

There has been recently proposed a video-on-demand service supplying system. This system is capable of supplying video information, such as movie information, to a user who has requested the video supplying service. In the video-on-demand service supplying system, a set top box is installed at the user's location. An information supplying device called a "video server" is provided at the servicing establishment. The information supplying device is provided with a data memory for storing information. When the user manipulates the set top box to request supply of a certain information, the information supplying device transmits the requested information to the user's side.

SUMMARY OF THE INVENTION

It is preferable that the information supplying device supplies not only movie information but also other various kinds of services such as game software supplying services, shopping services, and educational services. The user can watch video movies, play games, and shop with the aid of such services.

Some information provided by these services is composed of a plurality of different kinds of data. For example, data of each movie is composed of a set of movie image data and a set of movie sound data. Accordingly, when the user requests a movie supplying service, the information supplying device has to supply both the movie image data and the movie sound data to the user's side. When the movie is produced in a foreign language, image data of each movie includes a set of movie image data but also a set of movie subtitle image data. Accordingly, the information supplying device has to supply not only the movie image data but also the movie subtitle image data to the user's side. The information supplying device therefore has to store these various kinds of data (movie sound data, movie image data, and movie subtitle data) for each movie.

It is also preferable that the information supplying device can further supply karaoke entertaining services. The set top box may store information on a number of karaoke songs. That is, the set top box may store a MIDI (Musical Instrument Digital Interface) file and a text file for each song. The MIDI file includes accompaniment music data, and the text file includes lyric image data. When a user requests a song at the set top box, the information supplying device supplies data of a background image suited for the requested song. The set top box composes the supplied background image with the lyric image of the requested song. The set top box displays the composite image on a monitor television in synchronization with playing the accompaniment music data.

According to this structure, however, the set top box has to include a memory, such as a hard disk, for storing the accompaniment music data and the lyric image data. This increases size and price of the set top box.

It is therefore conceivable that the lyric image data or the accompaniment music data not be stored in the set top box. Instead, the information supplying device may supply background image data, lyric image data, and accompaniment music data to the set top box. In this case, however, the information supplying device has to store those several kinds of data (background image data, lyric image data, and accompaniment music data) for each song.

It is therefore, an object of the present invention to provide an information supplying device which can store, in a memory of a small capacity, the above-described type of information that is composed of a plurality of kinds of data.

In order to attain the above object and other objects, the present invention provides an information supplying device for supplying information to an information output device for outputting information, the information supplying device comprising: information storing means for storing at least one kind of first information and at least one kind of second information, the first information capable of being combined with the second information; composing means for composing the first information and the second information read out from the information storing means: and supplying means for supplying the composite information to an information output device.

According to another aspect, the present invention provides an information supplying device for supplying information to an information output device for outputting information, the information supplying device comprising: first information storing means for storing first information; second information storing means for storing second information; composing means for composing the first information read out from the first information storing means and the second information read out from the second information storing means; and supplying means for supplying the composite first and second information to an information output device.

The second information storing means may store a plurality of sets of second data, and the first information storing means may store a plurality of sets of first data, each set of first data being capable of being combined with one or more sets of second data, the composing means composing a certain set of first data and one of the corresponding one or more sets of second data, the supplying means supplying the composite first and second data to the information output device.

BRIEF DESCRIPTION OF THE DRAWINGS

The above and other objects, features and advantages of the invention will become more apparent from reading the following description of the preferred embodiment taken in connection with the accompanying drawings in which:

FIGS. 4(A) through 4(D) illustrate how background video signals and accompaniment music signals are converted in an information supplying device employed in FIG. 3, in which FIG. 4(A) shows how a set of background video signals are converted and FIGS. 4(B)–(D) show how three sets of accompaniment music signals are converted;

FIGS. 5(A) through 5(C) illustrate how background video signals and accompaniment music signals are combined when supplied to a terminal, in which FIG. 5(A) shows a composite signal produced from signals shown in FIGS. 4(A) and 4(B), FIG. 5(B) shows a composite signal produced from signals shown in FIGS. 4(A) and 4(C), and FIG. 5(C) shows a composite signal produced from signals shown in FIGS. 4(A) and 4(D);

FIGS. 12(A) through 12(D) illustrate how background video signals and lyric video signals are converted in an information supplying device employed in FIG. 11, in which FIG. 12(A) shows how a set of background video signals are converted and FIGS. 12(B)–(D) show how three sets of lyric video signals are converted:

FIGS. 13(A) through 13(C) illustrate how background video signals and lyric video signals are combined when supplied to a terminal, in which FIG. 13(A) shows a composite signal produced from signals shown in FIGS. 12(A) and 12(B), FIG. 13(B) shows a composite signal produced from signals shown in FIGS. 12(A) and 12(C), and FIG. 13(C) shows a composite signal produced from signals shown in FIGS. 12(A) and 12(D);

FIG. 15 is a block diagram schematically showing a structure of a video server system according to an eighth embodiment of the present invention.

DETAILED DESCRIPTION OF THE PREFERRED EMBODIMENTS

Figure 1:
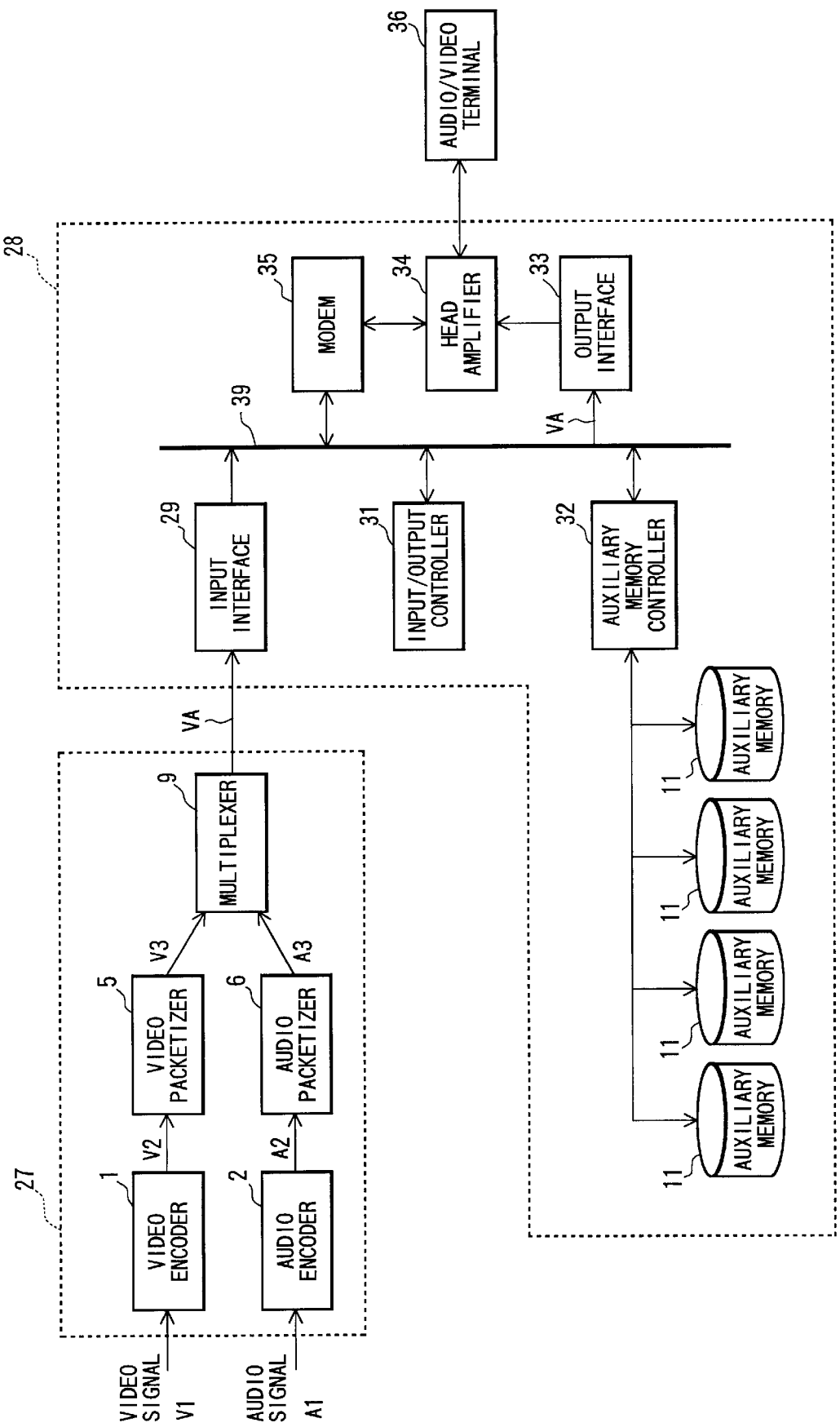
FIG. 1 is a block diagram schematically showing a structure of a video server system according to a first embodiment of the present invention.

An information supplying device according to preferred embodiments of the present invention will be described while referring to the accompanying drawings wherein like parts and components are designated by the same reference numerals to avoid duplicating description.

A first embodiment of the information supplying device will be described below with reference to FIGS. 1 and 2.

The information supplying device of the first embodiment can supply to terminals information comprised of image data and sound data.

FIG. 1 is a block diagram schematically showing a structure of a server system in which an information supplying device 28 of the present embodiment is connected to one or more terminals 36 via a transmission line 7. The information supplying device 28 is for supplying information to the terminal 36 via the transmission line 7. The transmission line 7 is constructed from a coaxial cable in this example. However, the transmission line 7 can be constructed from other various kinds of transmission paths. For example, the information supplying device 28 can supply information to the terminal 36 using a radio transmission method.

The information supplying device 28 stores therein information to be transmitted to the terminal 36. Various types of information can be inputted to the information supplying device 28 from outside via an encoder device 27.

The encoder device 27 includes a video encoder 1 and an audio encoder 2, a video packetizer 5, an audio packetizer 6, and a multiplexer 9. The video encoder 1 is for receiving a set of video signals V1 and for converting the video signals V1 into an encoded digital data train V2. The digital data train V2 is a compressed image data train. The video packetizer 5 is for receiving the digital data train V2 and for converting the digital data train V2 into a packet data train V3.

The audio encoder 2 is for receiving a set of audio signals A1 and for converting the audio signals A1 into an encoded digital data train A2. The digital data train A2 is a compressed data train. The audio packetizer 6 is for receiving the digital data train A2 and for converting the digital data train A2 into a packet data train A3. The multiplexer 9 is for composing the packet data trains V3 and A3 into a single packet data train VA.

The information supplying device 28 includes: an input interface 29, an input/output controller 31, an auxiliary memory controller 32, a modem 35, and an output interface 33 which are all connected via a bus line 39 with one another. Auxiliary memories 11 are connected to the auxiliary memory controller 32. A head amplifier 34 is connected to both the modem 35 and the output interface 33.

The head amplifier 34 is connected to the terminal 36 via the transmission line 7.

The input interface 29 is for receiving the packet data train VA from the multiplexer 9. The memory controller 32 can be controlled by the input/output controller 31 to write data to and read data from the auxiliary memories 11. The input/output controller 31 controls the auxiliary memory controller 32 to write, into one of the memories 11, the packet data train VA inputted at the input interface 29.

The head amplifier 34 can receive a request transmitted via the transmission line 7 from the terminal 36. When the head amplifier 34 receives a request for certain information, the input/output controller 31 controls the memory controller 32 to read out, from one of the memories 11, the packet data train VA indicative of the requested information.

The output interface 33 is for transferring the packet data train VA from the auxiliary memory 11 to the head amplifier 34, from which the composite packet data train VA is transmitted to the transmission line 7.

The encoder device 27 is separately provided to the device 28. The encoder device 27 is connected to the device 28 when information is stored into the device 28. It is noted, however, that the encoder device 27 may be integrally formed with the information supplying device 28.

Next, the structure of the terminal 36 will be described with referring to FIG. 2.

The terminal 36 includes: a control portion 41, an input device 43, an amplifier 47, a speaker 49, a monitor television 53, a terminal modem 57, a system decoder 58, a video decoder 59, an audio decoder 60, and an input/output interface 69.

The control portion 41 is for controlling the entire device 36. The terminal modem 57 is for receiving and processing various signals transmitted from the information supplying device 28. The control portion 41 includes a CPU 61, a ROM 63, a RAM 65, and so on which are connected to the input device 43 and the input/output interface 69 via a bus line 67.

The input device 43 is provided with several key switches with which an operator can manipulate the terminal 36. The several key switches include: a numerical pad 43a for inputting a requested information number (such as a song number and a movie number), mode keys 43b for inputting desired operation modes, a power switch 43c for turning on and off the power of the terminal 36.

The system decoder 58 is for receiving the composite packet data train VA transmitted from the video information supplying device 28. The system decoder 58 serves as a demultiplexer for converting the packet data train VA into the video packet data train V3 and the audio packet data train A3. The system decoder 58 further converts the video packet data train V3 into the digital data train V2 and converts the audio packet data train A3 into the digital data train A2.

The video decoder 59 is for receiving the digital data train V2 from the system decoder 58 and for converting the digital data train V2 into the analog video signals V1. The video decoder 59 outputs the analog video signals V1 to the monitor television 53.

The audio decoder 60 is for receiving the digital data train A2 from the system decoder 58 and for converting the digital data train A2 into the analog audio signals A1. The audio decoder 60 outputs the analog audio signals A1 to the amplifier 47. The amplifier 47 amplifies the audio signals A1 before supplying the signals to the speaker 49. It is noted that when attaining a karaoke performance, a microphone is connected to the amplifier 47 so that the user's voice signals from the microphone are inputted to the amplifier 47. The amplifier 47 mixes the user's voice signals with the audio signals A1 and outputs the mixed signals to the speaker 49.

The terminal modem 57 is connected to the input/output interface 69. The terminal modem 57 receives a request via the input/output interface 69 from the control portion 41, and transmits the request to the information supplying device 28 via the transmission line 7.

It is noted that the terminal 36 may not be provided with the monitor television 53, the amplifier 47, or the speaker 49. It is sufficient that the terminal 36 can output analog video signals V1 to an external normal type of television receiver. The terminal 36 can output analog audio signals A1 to an external normal type of amplifier/speaker unit.

With the above-described structure, information is stored into the device 28 in the following manner.

A set of video signals V1 is inputted to the video encoder 1, where the video signal set V1 is converted into a digital data train V2. The digital data train V2 is then inputted to the video packetizer 5, where the digital data train V2 is converted into a packet data train V3. The packet data train V3 is inputted to the multiplexer 9.

A set of audio signals A1 to be composed or combined with the set of video signals V1 is inputted to the audio encoder 2, where the audio signal set A1 is converted into another digital data train A2. The digital data train A2 is then inputted to the audio packetizer 6, where the digital data train A2 is converted into another packet data train A3. The packet data train A3 is inputted to the multiplexer 9.

In the multiplexer 9, the packet data trains V3 and A3 are included in a single packet data train VA. The packet data train VA is then inputted to the input interface 29.

The thus inputted packet data train VA is then stored into one of the auxiliary memories 11 by the auxiliary memory controller 32.

For example, in order to store information of a certain movie in the device 28, a set of video signals V1 indicative of the movie image and a set of audio signals A1 indicative of the movie sound are inputted to the encoder device 27. A composite packet data train VA produced from these signals is stored in the memory 11. In order to store information of a certain karaoke song to the device 28, a set of video signals V1 indicative of the background image and a set of audio signals A1 indicative of the accompaniment music are inputted to the encoder device 27. A composite packet data train VA produced from these signals is stored in the memory 11.

The information supplying device 28 supplies information to the terminal 36 in the following manner.

When the terminal 36 transmits a request to the information supplying device 28 via the transmission line 7, the request is inputted to the input/output controller 31 via the head amplifier 34 and the modem 35. The input/output controller 31 controls the controller 32 to read out the packet data train VA indicative of the requested information from one of the memories 11.

The packet data train VA is then transmitted via the output interface 33 and the head amplifier 34 to the terminal 36 that has requested the transmission of the information.

Thus, the requested information is transmitted to the terminal 36. In the terminal 36, the received packet data train VA is decoded and then subjected to a certain processing operation. In more concrete terms, in the system decoder 58, the packet data train VA is divided into a video packet data train V3 and an audio packet data train A3. The video packet data train V3 is converted into a video digital data train V2, and the audio packet data train A3 is converted into an audio digital data train A2.

The video digital data train V2 is converted into analog video signals V1 by the video decoder 59. The analog video signals V1 are then displayed on the monitor television 53. The audio digital data train A2 is converted into analog audio signals A1 by the audio decoder 60. The analog audio signals A1 are then amplified by the amplifier 47 before being outputted from the speaker 49.

For example, when a user inputs via the input device 43 a song number representing his/her desired karaoke song, the request transmitted from the terminal to the device 28 indicates the requested song number. In this case, the input/output controller 31 reads out a composite packet data train VA of the requested song. The packet data train VA is transmitted to the terminal 36. At the terminal 36, the monitor television 53 displays a background image while the speaker 49 outputs karaoke accompaniment music.

When the user inputs a movie number representing his/her desired movie, the request transmitted from the terminal to the device 28 indicates the requested movie number. In this case, the input/output controller 31 reads out a composite packet data train VA of the requested movie. The packet data train VA is transmitted to the terminal 36. At the terminal 36, the monitor television 53 displays movie images while the speaker 49 outputs the movie soundtrack.

As described above, according to the present embodiment, when information to be stored in the information supplying device 28 is comprised of a plurality of sets of signals, all the sets of signals are first encoded or compressed into digital data trains. Then, the digital data trains are converted into packet data trains. Then, the packet data trains are composed into a single composite packet data train. The single composite packet data train is stored in the information supplying device 28. Accordingly, it is possible to store the data in memories of a small capacity.

A second embodiment will be described with reference to FIG. 3.

Figure 3:
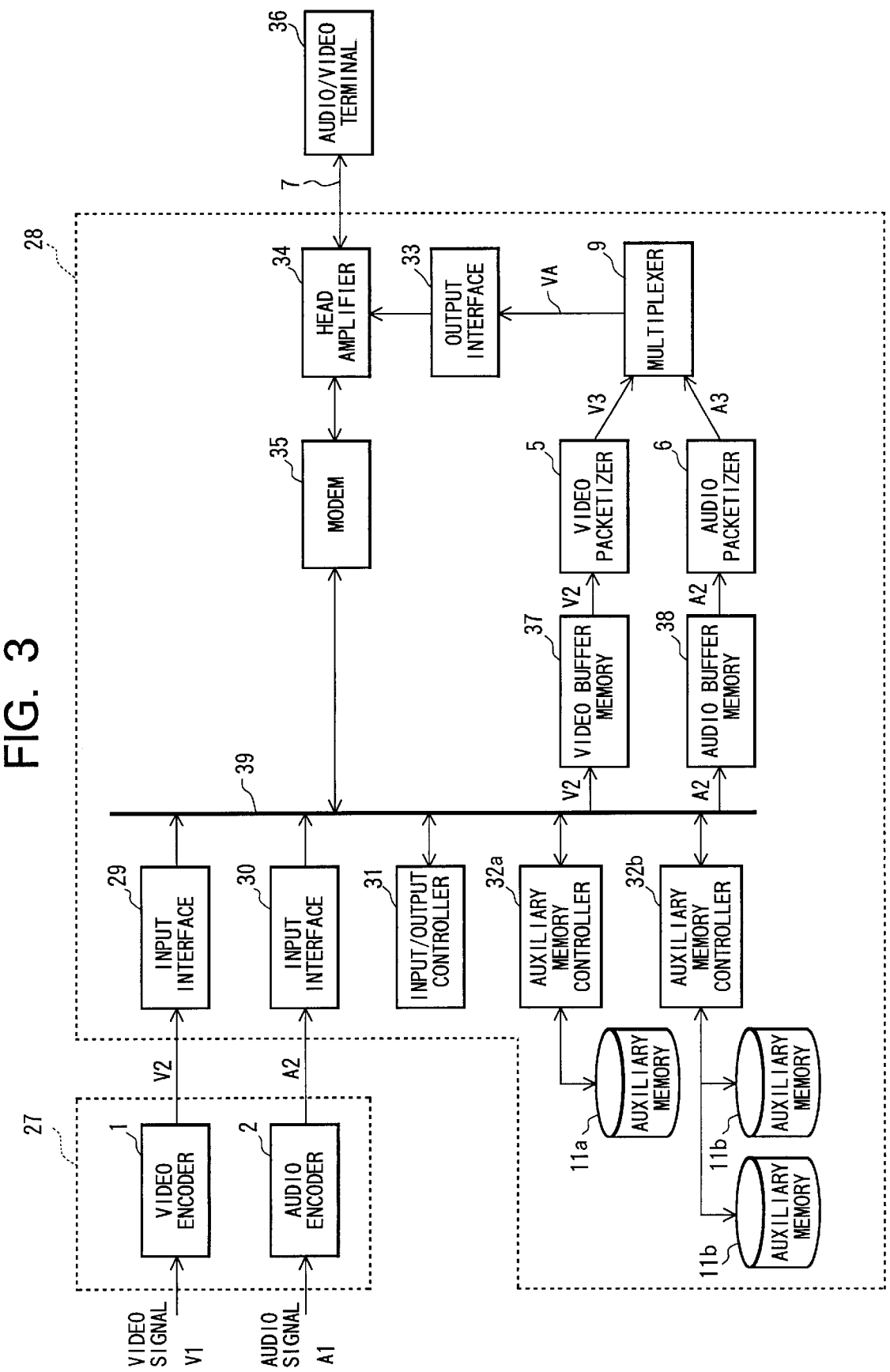
FIG. 3 is a block diagram schematically showing a structure of a video server system according to a second embodiment of the present invention.

In this system shown in FIG. 3, the video packetizer 5, the audio packetizer 6, and the multiplexer 9 are not provided in the encoder device 27. These elements are provided in the information supplying device 28.

The encoder device 27 includes the video encoder 1 and the audio encoder 2. Receiving the video signals V1 and the audio signals A1, the encoder device 27 produces a digital data train V2 and a digital data train A2. The encoder device 27 outputs those data trains V2 and A2 to the information supplying device 28.

The information supplying device 28 of the present embodiment is the same as that of the first embodiment except for the following points.

The information supplying device 28 is provided with two input interfaces, that is, a first input interface 29 and a second input interface 30, and two auxiliary memory controllers, that is, a first auxiliary memory controller 32a and a second auxiliary memory controller 32b. The information supplying device 28 is further provided with a video buffer memory 37 and an audio buffer memory 38. The first and second input interfaces 29 and 30, the input/output controller 31, the first and second auxiliary memory controllers 32a and 32b, the modem 35, the video buffer memory 37, and the audio buffer memory 38 are all connected via the bus line 39 with one another. A first auxiliary memory 11a is connected to the first auxiliary memory controller 32a. Second auxiliary memories 11a are connected to the second auxiliary memory controller 32b. The video buffer memory 37 and the audio buffer memory 38 are connected to the video packetizer 5 and the audio packetizer 6, respectively. The multiplexer 9 is connected to both the video packetizer 5 and the audio packetizer 6. The output interface 33 is connected to both the multiplexer 9 and the head amplifier 34.

The first input interface 29 is for receiving the digital data train V2 from the video encoder 1, and the second input interface 30 is for receiving the digital data train A2 from the audio encoder 2.

The first memory controller 32a can be controlled by the input/output controller 31 to write data to and read data from the first auxiliary memory 11a. The second memory controller 32b can be controlled by the input/output controller 31 to write data to and read data from the second auxiliary memories 11b.

The input/output controller 31 controls the first auxiliary memory controller 32a to write into the memory 11a the digital data train V2 inputted at the first input interface 29. The input/output controller 31 controls the second auxiliary memory controller 32b to write into the memories 11b the digital data train A2 inputted at the second input interface 30.

When the head amplifier 34 receives a request for certain information, the input/output controller 31 controls the memory controllers 32a and 32b to read out, from the memories 11a and 11b, the digital data train V2 and the digital data train A2 of the requested information.

The video buffer memory 37 and the audio buffer memory 38 are respectively for temporarily storing the digital data train V2 and the digital data train A2 thus read out from the memories 11a and 11b. The video packetizer 5 is for converting the digital data train V2 into a packet data train V3. The audio packetizer 6 is for converting the digital data train A2 into a packet data train A3.

The multiplexer 9 is for composing the packet data trains V3 and A3 outputted from the packetizers 5 and 6 into a single packet data train VA. The output interface 33 is for transferring the composite packet data train VA from the multiplexer 9 to the head amplifier 34, from which the composite packet data train VA is transmitted to the transmission line 7.

Figure 2:
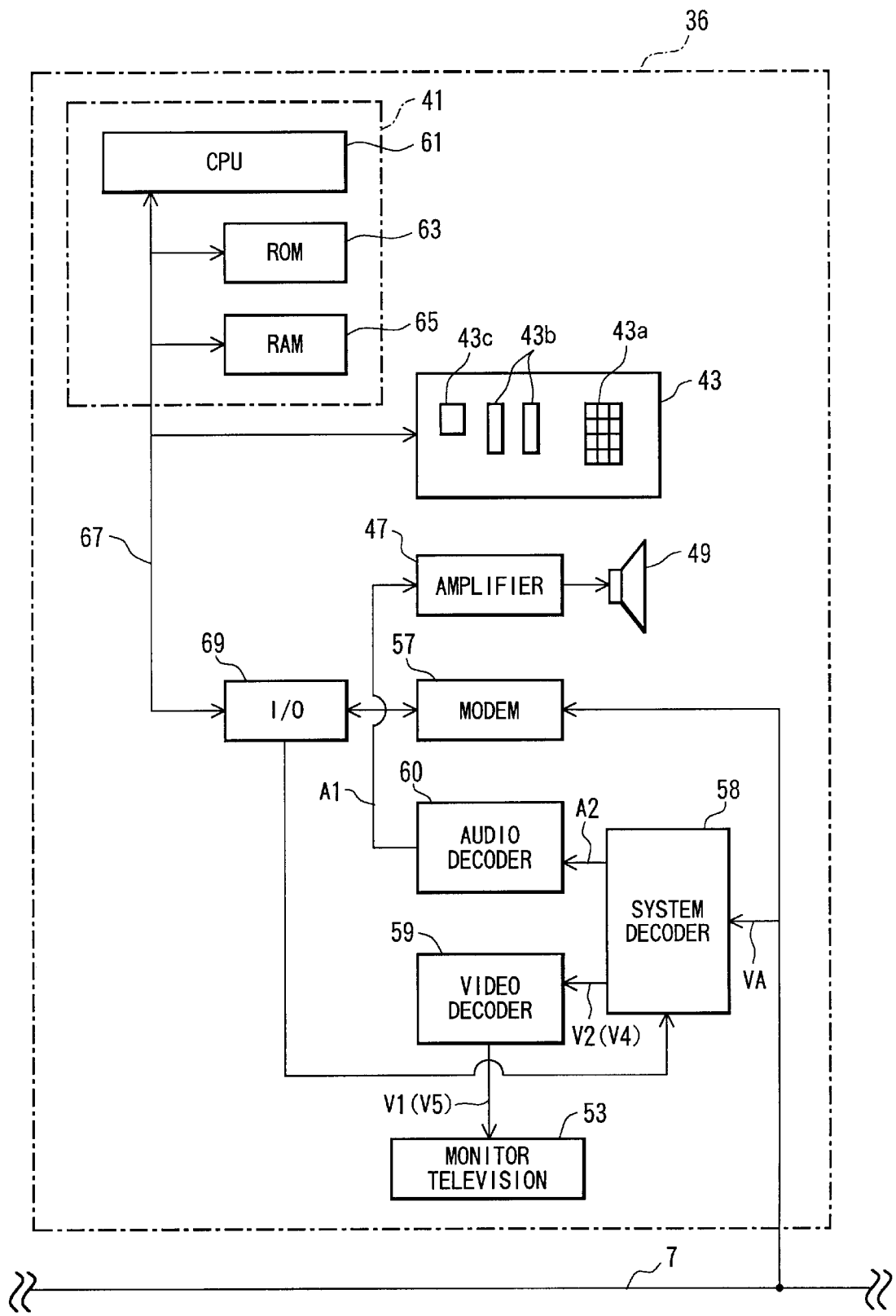
FIG. 2 is a block diagram schematically showing a structure of a terminal employed in FIG. 1.

The structure of the terminal 36 of the second embodiment is the same as that shown in FIG. 2.

With the above-described structure, information is stored into the device 28 in the following manner.

A set of video signals V1 is inputted to the video encoder 1, where the video signal set V1 is converted into a digital data train V2. The digital data train V2 is then inputted to the first input interface 29.

Another set of audio signals A1 is inputted to the audio encoder 2, where the audio signal set A1 is converted into another digital data train A2. The digital data train A2 is then inputted to the second input interface 30.

The thus inputted digital data train V2 is then stored into the first auxiliary memory 11a by the first auxiliary memory controller 32a. Similarly, the digital data train A2 is stored into the second auxiliary memory 11b by the second auxiliary memory controller 32b.

The information supplying device 28 supplies information to the terminal 36 in the following manner.

When the terminal 36 transmits a request to the information supplying device 28 via the transmission line 7, the request is inputted to the input/output controller 31 via the head amplifier 34 and the modem 35. The input/output controller 31 controls the controllers 32a and 32b to read out, from the memories 11a and 11b, digital data trains V2 and A2 representative of the requested information.

The digital data trains V2 and A2 are temporarily stored in the buffers 37 and 38, respectively. The digital data train V2 is then outputted to the video packetizer 5, where the data train is converted into a packet data train V3. Similarly, the digital data train A2 is outputted to the audio packetizer 6, where the data train A2 is converted into another packet data train A3. These packet data trains V3 and A3 are combined into a single packet data train VA in the multiplexer 9. The packet data train VA is then transmitted via the output interface 33 and the head amplifier 34 to the terminal 36 that has requested the transmission of the information.

Thus, the requested information is transmitted to the terminal 36. In the terminal 36, the received packet data train VA is processed in the same manner as in the first embodiment.

Next will be described how karaoke information is stored into the information supplying device 28 of the present embodiment.

In the first embodiment, a set of background image signals V1 and a set of accompaniment music signals A1 are prepared for each song, combined into a packet data train VA, and stored in the memories 11. It is noted that each accompaniment music set is used exclusively for Its corresponding karaoke song. However, each background image set can be used for several karaoke songs of the same genre. It is therefore unnecessary that a set of background image signals V1 be prepared for each song.

Accordingly, in the present embodiment, a set of audio signals A1 indicative of accompaniment music is prepared for each song and stored in the device 28. However, a set of video signals V1 indicative of background images is not prepared for each song. Instead, several sets of background video signals V1 are prepared for each genre of karaoke songs. Each set of background video signals V1 will therefore be used for a plurality of songs belonging to the same corresponding genre. In other words, each set of video signals V1 will be combined with a plurality of sets of accompaniment music signals A1 of the corresponding genre.

According to the present embodiment, the background video signals V1 and the accompaniment music signals A1 are stored separately in the memories 11a and 11b in the form of digital data trains V2 and A2. When a certain song is requested, the accompaniment music train A2 for the requested song is retrieved from the memory 11b. The background video data train V2 for a genre, to which the requested song belongs, is retrieved from the memory 11a. The retrieved signals V2 and A2 are composed into a single packet data train VA before being transmitted to the requesting terminal 36.

FIGS. 4(A) through 4(D) illustrate how one set of background video signals V1 can be used for several, three, in this case, karaoke songs "a", "b", and "c" of a corresponding genre.

FIG. 4(A) shows one set of background video signals V1 suited for a certain song genre. The set of video signals V1 is converted into a digital data train V2 and stored in the memory 11a. When a song, belonging to a genre of the background video signals V1, is requested, the digital data train V2 will be retrieved from the memory 11a and converted into a packet data train V3. The packet data train V3 is constructed from six packets of data: PV(1), PV(2), PV(3), PV(4), PV(5), and PV(6).

FIGS. 4(B) through 4(D) respectively show three sets of accompaniment music audio signals A1a, A1b, and A1c for three different karaoke songs "a," "b," and "c" that belong to the song genre suited for the background video signals V1 of FIG. 4(A).

As shown in FIG. 4(B), the set of audio signals A1a is converted into a digital data train A2a and stored in the memory 11b. When the song "a" is requested, the digital data train A2a will be retrieved from the memory 11b and converted into a packet data train A3a. The packet data train A3a is constructed from three packets of data: PAa(1), PAa(2), and PAa(3).

Similarly, as shown in FIGS. 4(C) and 4(D), the sets of audio signals A1b and A1c are converted into digital data trains A2b and A2c and stored in the memory 11b. When the songs "b" and "c" are requested, the digital data trains A2b and A2c will be retrieved from the memory 11b and converted into packet data trains A3b and A3c. The packet data train A3b is constructed from three packets of data: PAb(1), PAb(2), and PAb(3). Similarly, the packet data train A3c is constructed from three packets of data: PAc(1), PAc(2), and PAc(3).

It is assumed that a user at the terminal 36 requests a karaoke song "a". In this case, the digital data train A2a is retrieved from the memory 11b. The data train A2a is converted into the packet data train A3a and outputted to the multiplexer 9. Because the set of background video signals V1 corresponds to the genre to which the requested song "a" belongs, the corresponding digital data train V2 is retrieved from the memory 11a and converted into the packet data train V3. The packet data train V3 is outputted to the multiplexer 9. The multiplexer 9 then composes the packet data trains A3a and V3 into a single packet data train VAa shown in FIG. 5(A) where the packets PV(1), PV(2), PAa(1), PV(3), PV(4), PAa(2), PV(5), PV(6), and PAa(3) are arranged in the order listed. The thus composed packet data train is transmitted to the terminal 36.

Similarly, when another karaoke song "b" is requested, the packet data trains V3 and A3b are composed into a single packet data train VAb shown in FIG. 5(B) where the packets PV(1), PV(2), PAb(1), PV(3), PV(4), PAb(2), PV(5), PB(6), and PAb(3) are arranged in the order listed. When still another karaoke song "c" is requested, the packet data trains V3 and A3c are composed into a single packet data train VAc shown in FIG. 5(C) where the packets PV(1), PV(2), PAc(1), PV(3), PV(4), PAc(2), PV(5), PV(6), and PAc(3) are arranged in the order listed.

Thus, according to the present embodiment, the background data train V2 shown in FIG. 4(A) is stored in the first auxiliary memory 11a. The music accompaniment data trains A2a, A2b, and A2c shown in FIGS. 4(B) through 4(D) are stored in the second auxiliary memory 11b. The background data train V2 and the music accompaniment data trains A2a, A2b, and A2c are thus stored separately in the information supplying device 28. However, when the song "a" is requested at a terminal, the data trains V2 and A2a are composed into a single data train VAa and outputted to the terminal 36. When the song "b" is requested at a terminal, the data trains V2 and A2b are composed into a single data train VAb and outputted to the terminal 36. When the song "c" is requested at a terminal, the data trains V2 and A2c are composed into a single data train VAc and outputted to the terminal 36.

If the information is stored in the information supplying device 28 in the form of the composite packet data trains as in the first embodiment, the composite packet data trains VAa, VAb, and VAc shown in FIGS. 5(A) through 5(C) have to be stored in the memories 11. It is noted, however, that every composite packet train VAa, VAb, and VAc includes the same packets PV(1), PV(2), PV(3), PV(4), PV(5), and PV(6). Thus, the same packets PV(1), PV(2), PV(3), PV(4); PV(5), and PV(6) are stored in triplicate in the memories 11.

Contrarily, according to the present embodiment, the background video data V2 are not stored in triplicate. The storage capacity of the memories 11a and 11b can therefore be made smaller than the memories 11 in the first embodiment.

It is now assumed that the information supplying device 28 is desired to be capable of supplying 10,000 karaoke songs. The karaoke songs are now divided into two genres: Japanese "enka" songs and "pops" songs. 10,000 sets of accompaniment music signals A1 are stored in the second auxiliary memories 11b in the form of digital data trains A2. On the other hand, only 100 sets of "enka" background video signals V1 and 100 sets of "pops" video signals V1 are prepared and stored in the first auxiliary memory 11a in the form of digital data trains V2. It is unnecessary to prepare and store 10,000 sets of background video signals V1. The storage capacity of the memory 11a can be made as small as 1/50 of the case when 10,000 sets of video signals V1 are stored as in the first embodiment.

Thus, the total amount of data stored in the memories 11a can be minimized. Still, the information supplying device 28 can supply background images suited for the user's selected songs similarly as in the first embodiment.

Thus, according to the present embodiment, the first auxiliary memory 11a can store background image information in the form of digital data, and the second auxiliary memory 11*b* can store sound information in the form of digital data. When a request is transmitted from the terminal 36 to the information supplying device 28, a background image information of a genre, to which the requested song belongs, is retrieved from the first auxiliary memory 11*a*, packetized by the video packetizer 5, and outputted to the multiplexer 9. A sound information for the requested song is retrieved from the second auxiliary memory 11*b*, packetized by the audio packetizer 6, and outputted to the multiplexer 9. The background image information and the sound information are. combined into a single packet data train and outputted to the terminal 36.

The information supplying device 28 of the present embodiment stores movie information in the following manner.

In the first embodiment, when information of each movie is stored in the information supplying device 28, a set of movie image signals V1 and a set of movie sound signals A1 are prepared for each movie, and stored in the information supplying device 28. However, in the present embodiment, several sets of movie sound signals A1 are prepared in several languages for each movie. The set of movie image signals V1 and the corresponding several sets of movie sound signals A1 are stored in the memories. 11*a* and 11*b*, respectively, in the forms of digital data trains V2 and A2.

A user at the terminal 36 can request supply of a certain movie in a certain language. The input/output controller 31 reads out from the memory 11*a* a requested set of movie image data V2. The input/output controller-31 reads out from the memory 11*b* a set of movie sound data A2 in the requested language. The multiplexer 9 will combine those data and output-the information to the terminal 36.

A third embodiment will be described below with reference to FIG. 6.

In the second embodiment, video signals V1 and audio signals A1 are converted into digital data trains V2 and A2, and then stored in the memories 11*a* and 11*b*. However, in the present embodiment, the digital data trains V2 and A2 are further converted into packet data trains V3 and A3 before being stored into the memories 11*a* and 11*b*.

Figure 6:
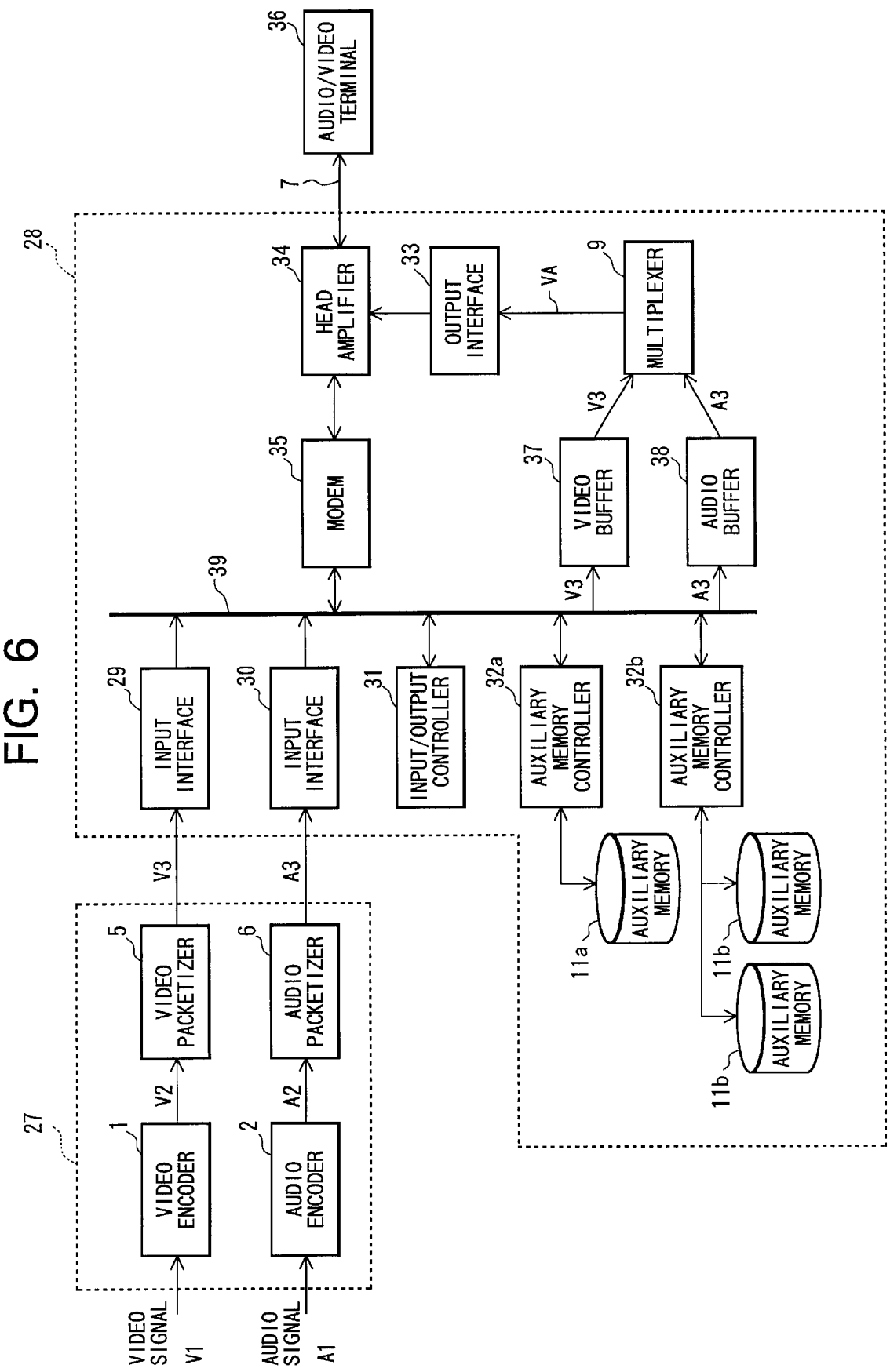
FIG. 6 is a block diagram schematically showing a structure of a video server system according to a third embodiment of the present invention.

FIG. 6 shows a video server system in which the information supplying device 28 of the third embodiment is connected to one or more terminals 36 via the transmission line 7. The information supplying device 28 is connected to the encoder device 27 at least when information is stored into the device 28.

The information supplying device 28 of the present embodiment is the same as the information supplying device 28 of the second embodiment except that the device 28 of the present embodiment is not provided with the video packetizer 5 and the audio packetizer 6. Instead, the packetizers 5 and 6 are provided the encoder device 27. The video packetizer 5 is connected to the video encoder 1, and the audio packetizer 6 is connected to the audio encoder 2.

With this structure, a set of video signals V1 is converted into a digital data train V2 by the video-encoder 1. The digital data train V2 is further converted into a packet data train V3 by the video packetizer 5. The packet data train V3 is inputted through the first input interface 29 into the first auxiliary memory 11*a*.

Similarly, a set of audio signals A1 is converted into a digital data train A2 by the audio encoder 2. The digital data train A2 is further converted into a packet data train A3 by the audio packetizer 6. The packet data train A3 is inputted through the second input interface 30 into the second auxiliary memory 11*b*.

When transmission is requested by the terminal 36, the packet data trains V3 and A3 are read out of the memories 11*a* and 11*b*. The packet data train V3 is temporarily stored in the video buffer memory 37, and the packet data train A3 is temporarily stored in the audio buffer memory 38. The packet data trains are then outputted to the multiplexer 9. The packet data trains V3 and A3 are combined into a single packet data train VA by the multiplexer 9 and transmitted to the terminal 36 via the output interface 33 and the head amplifier 34.

Figure 7:
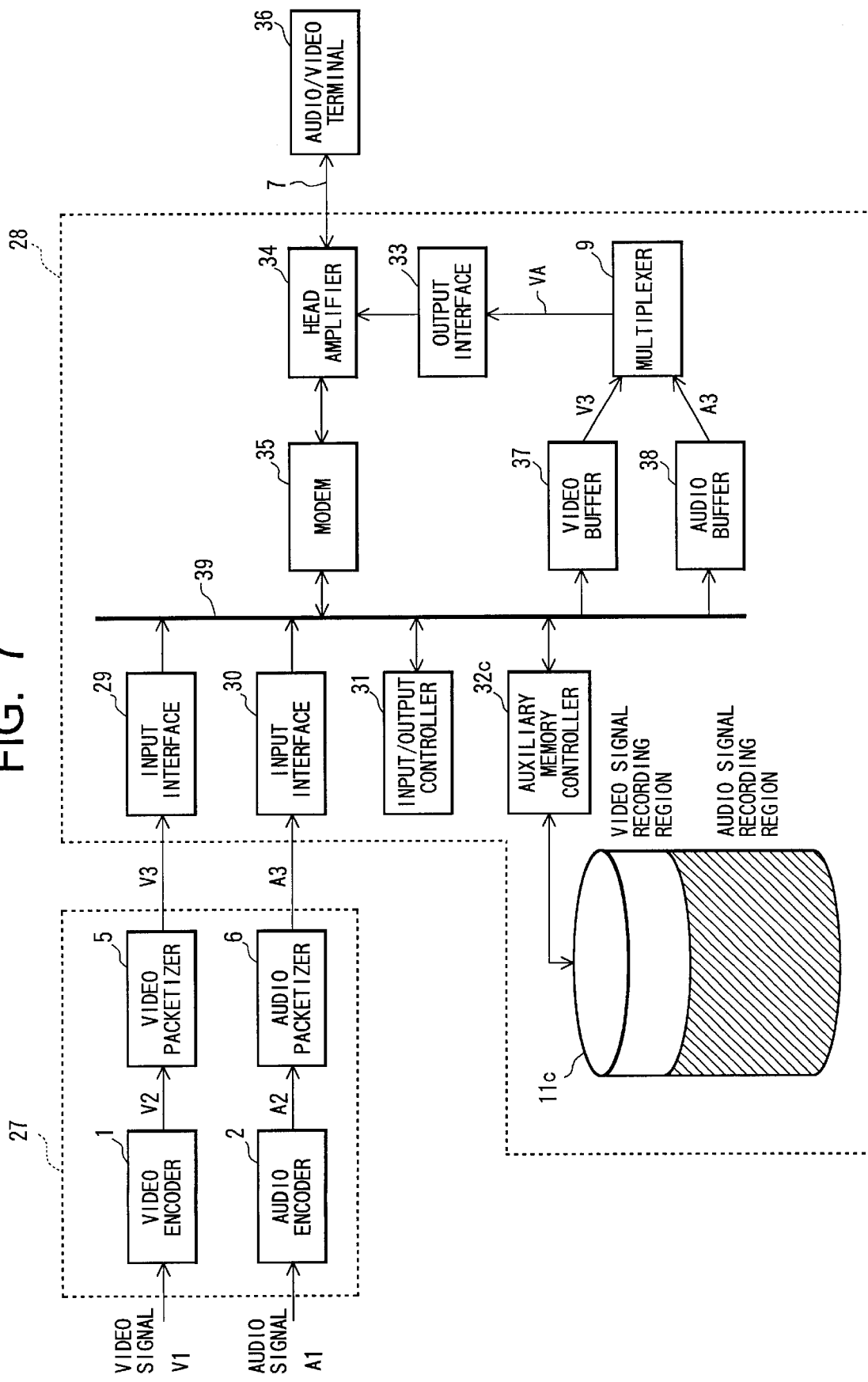
FIG. 7 is a block diagram schematically showing a structure of a video server system according to a fourth embodiment of the present invention.

A fourth embodiment will be described below with reference to FIG. 7.

The information supplying device 28 of the present embodiment is provided with a single auxiliary memory controller 32*c* and a single auxiliary memory 11*c*. Except for this point, the information supplying device 28 of the present embodiment is the same as that of the third embodiment.

The auxiliary memory 11*c* is provided with both a video signal recording region and an audio signal recording region. The auxiliary memory controller 32*c* can write the video packet data train V3 to and read out the data train V3 from the video signal recording region. The auxiliary memory controller 32*c* can write the audio packet data train A3 to and read out the data train A3 from the audio signal recording region.

Fifth through seventh embodiment will be described below with reference to FIGS. 8 through 14.

The first through fourth embodiments are directed to combine image data and sound data and to supply those data to the terminal. However, the fifth through seventh embodiments are directed to combine image data and another image data and to supply those data to the terminal.

Figure 8:
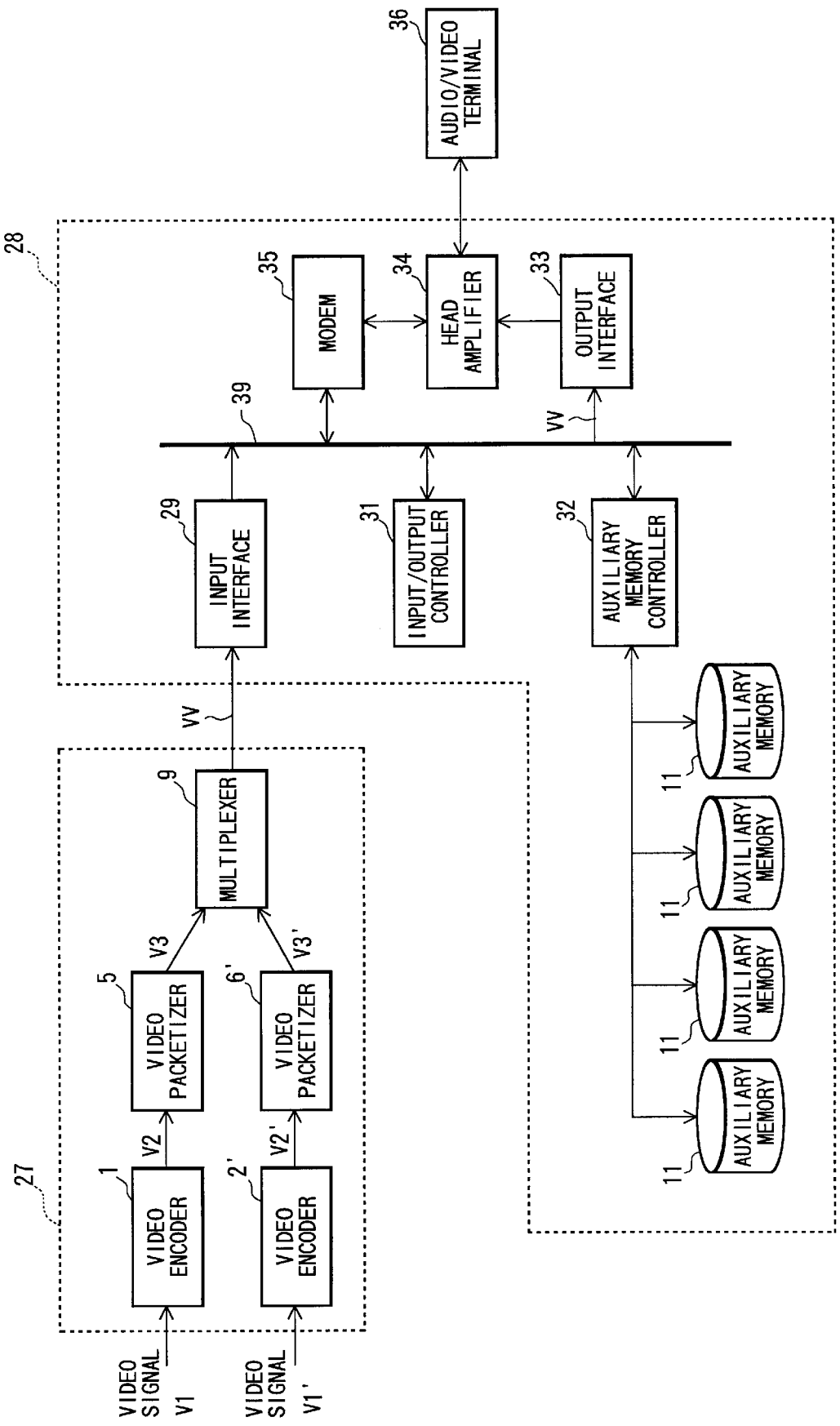
FIG. 8 is a block diagram schematically showing a structure of a video server system according to a fifth embodiment of the present invention.

The fifth embodiment will be described below with reference to FIGS. 8 and 9.

The information supplying device 28 of the present embodiment is the same as that of the first embodiment except for the following points. The encoder device 27 of the present embodiment has two video encoders 1 and 2' and two video packetizers 5 and 6', and has no audio encoder 2 or audio packetizer 6. In other words, the audio encoder 2 of the first embodiment is replaced with the video encoder 2'. The audio packetizer 6 of the first embodiment is replaced with the video packetizer 6'.

When image information is stored in the device 28, the encoder device 27 is connected to the information supplying device 28. In the encoder device 27, a set of video signals V1 is converted into an encoded digital data train V2 by the video encoder 1. The digital data train V2 is a compressed image data train. The digital data train V2 is converted into a packet data train V3 by the video packetizer 3. The packet data train V3 is inputted to the multiplexer 9. Another set of video signals V1' desired to be composed with the video signals V1 is converted into an encoded digital data train V2' by the video encoder 2'. The digital data train V2' is a compressed image data train. The digital data train V2' is then converted into a packet data train V3' by the video packetizer 6'. The packet data train V3' is inputted to the multiplexer 9.

The multiplexer 9 composes the packet data trains V3 and V3' into a single packet data train VV. The thus produced packet data train VV is inputted through the input interface 29 and the auxiliary memory controller 32 to one of the auxiliary memories 11.

Figure 9:
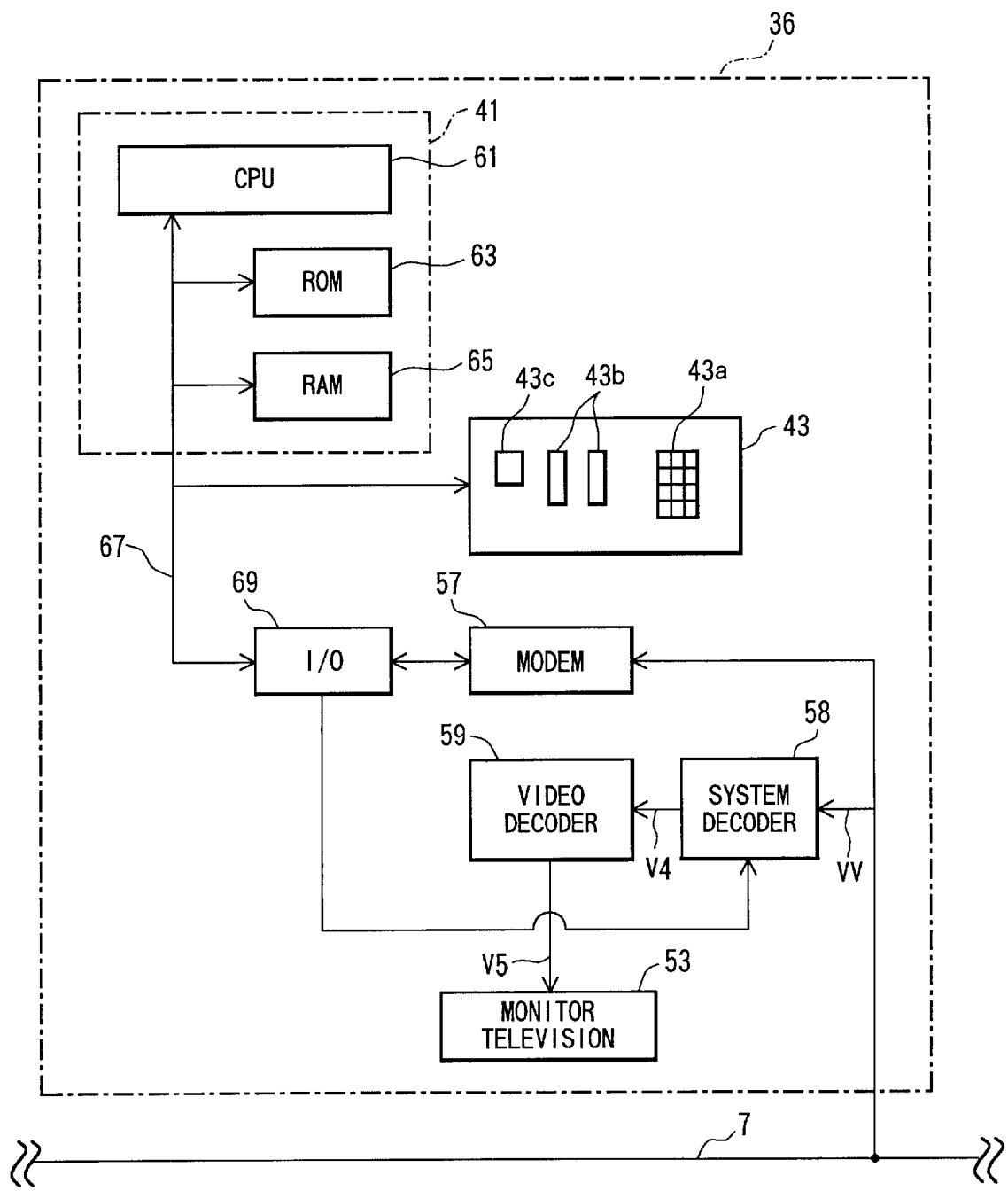
FIG. 9 is a block diagram schematically showing a structure of a terminal employed in FIG. 8.

The terminal 36 connected to the information supplying device 28 is shown in FIG. 9. The structure of the terminal 36 is the same as that of the terminal 36 of the first through fourth embodiments except that the terminal 36 does not include audio decoder 60, the amplifier 47, or the speaker 49. With this structure, the system decoder 58 receives the composite packet data train VV transmitted from the information supplying device 28 and for converting the packet data train VV into a digital data train V4. The video decoder 59 is for receiving the digital data train V4 from the system decoder 58 and for converting the digital data train V4 into analog video signals V5. The video decoder 59 outputs the analog video signals V5 to the monitor television 53. The thus obtained analog video signals V5 are composite signals of the original video signals V1 and V1'.

With the above-described structure, information is stored into the device 28 in the following manner.

A set of video signals V1 is inputted to the video encoder 1, where the video signal set V1 is converted into a digital data train V2. The digital data train V2 is then inputted to the video packetizer 5, where the digital data train V2 is converted into a packet data train V3. The packet data train V3 is inputted to the multiplexer 9.

Another set of video signals V1' to be composed with the set of video signals V1 is inputted to the video encoder 2', where the video signal set V1' is converted into another digital data train V2'. The digital data train V2' is then inputted to the video packetizer 6', where the digital data train V2' is converted into another packet data train V3'. The packet data train V3' is inputted to the multiplexer 9.

In the multiplexer 9, the packet data trains V3 and V3' are combined into a single packet data train VV. The packet data train VV is then inputted to the input interface 29. The thus inputted packet data train VV is then stored into one of the auxiliary memories 11 by the auxiliary memory controller 32.

For example, in order to store information of a certain movie in the device 28, a set of video signals V1 indicative of the movie image and a set of video signals V1' indicative of the movie subtitle image are inputted to the encoder device 27. A composite packet data train VV produced from these signals is stored in the memory 11.

In order to store information of a certain karaoke song in the device 28, a set of video signals V1 indicative of the background image and a set of video signals V1' indicative of the lyric image are inputted to the encoder device 27. A composite packet data train VV produced from these signals is stored in the memory 11.

The information supplying device 28 supplies information to the terminal 36 in the following manner.

When the terminal 36 transmits a request to the information supplying device 28 via the transmission line 7, the request is inputted to the input/output controller 31 via the head amplifier 34 and the modem 35. The input/output controller 31 controls the controller 32 to read out the packet data train VV indicative of the requested information from one of the memories 11.

The packet data train VV is then transmitted via the output interface 33 and the head amplifier 34 to the terminal 36 that has requested the transmission of the information.

Thus, the requested information is transmitted to the terminal 36. In the terminal 36, the received packet data train VV is decoded and then subjected to a certain processing operation. In more concrete terms, in the system decoder 58, the packet data train VV is converted into a video digital data train V4. The video digital data train V4 is converted into analog video signals V5 by the video decoder 59. The analog video signals V5 are then displayed on the monitor television 53.

For example, when a user inputs via the input device 43 a song number representing his/her desired karaoke song, the request transmitted from the terminal to the device 28 indicates the requested song number. In this case, the input/output controller 31 reads out a composite packet data train VV of the requested song. The packet data train VV is transmitted to the terminal 36. At the terminal 36, the packet data train VV is processed into analog video signals V5. It is noted that the thus obtained analog video signals V5 are composite signals of the original video signals V1 and V1'. Accordingly, the monitor television 53 can display both background images and lyric images on a single screen. For example, the packet data trains V3 and V3' (video signals V1 and V1') may be combined into the composite data VV (video signals V5) by the multiplexer 9 so that the video signals (background images) V1 will be displayed on an upper part of the monitor 36 and so that the video signals (lyric images) V1' will be displayed on the remaining lower part as shown in FIG. 10(A). In this case, when there are no lyrics, the lower part of the screen will be displayed without images.

Or otherwise, the packet data trains V3 and V3' (video signals V1 and V1') may be composed into the composite data VV (video signals V5) by the multiplexer 9 so that the background images V1 will be displayed on the entire area of the screen and so that the lyric images V1' will be displayed superimposed on the background images V1 at the lower part as shown in FIG. 10(B). Said differently, priority is given to the video signals V1' so that the lyric images V1' will be displayed over the background image V1. In this case, the background image will be displayed on the entire screen even when no lyric images are displayed.

When the user inputs a movie number representing his/her desired movie, the request transmitted from the terminal to the device 28 indicates the requested movie number. In this case, the input/output controller 31 reads out a composite packet data train VV of the requested movie. The packet data train VV is transmitted to the terminal 36. In the terminal 36, the monitor television 53 displays a movie image and a subtitle image on its display in the same manner as described with reference to FIG. 10(A) or 10(B).

A sixth embodiment will be described with reference to FIG. 11.

Figure 11:
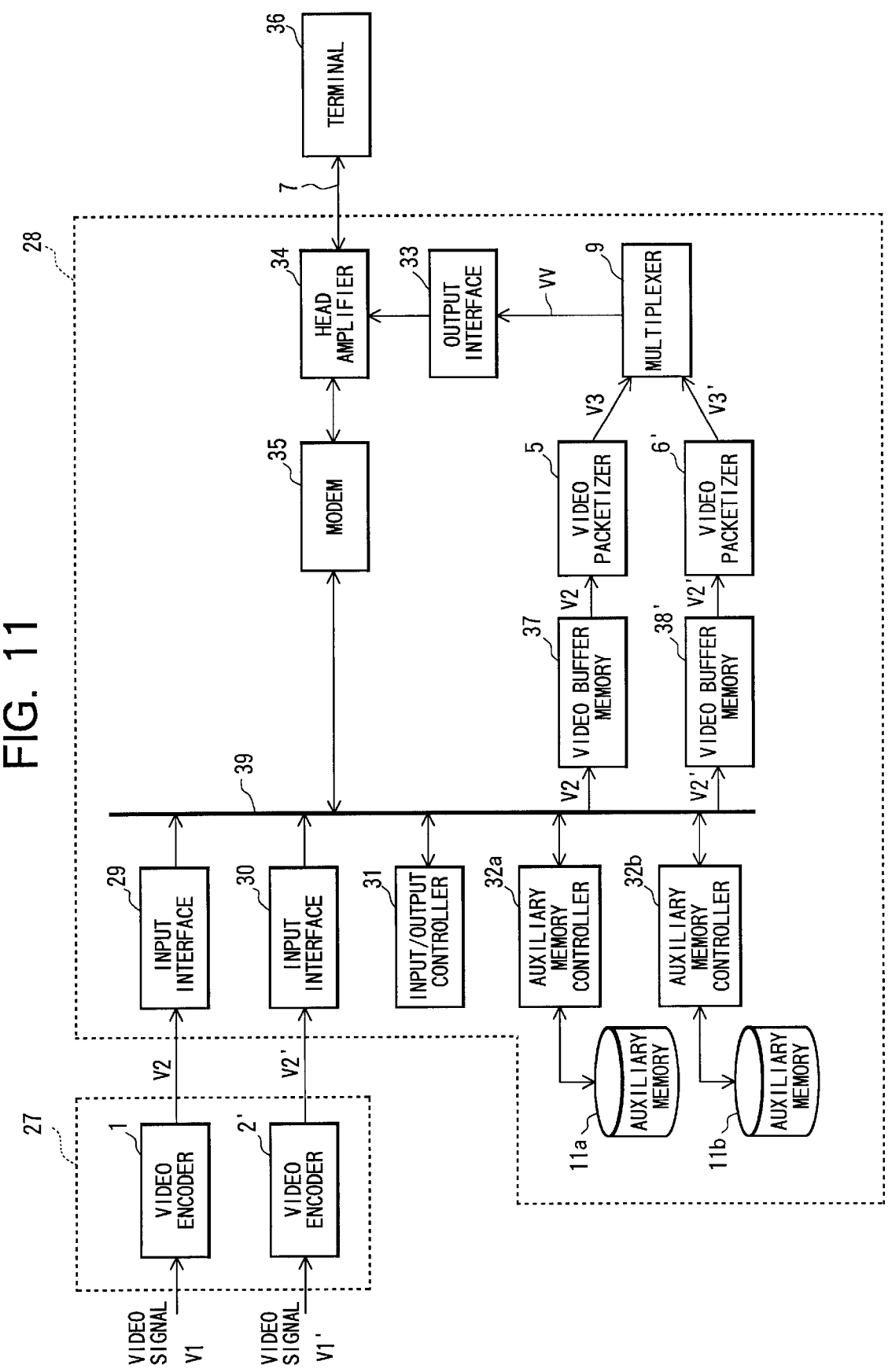
FIG. 11 is a block diagram schematically showing a structure of a video server system according to a sixth embodiment of the present invention.

In this system shown in FIG. 11, the video packetizers 5 and 6' and the multiplexer 9 are not provided in the encoder device 27. These elements are provided in the information supplying device 28.

The encoder device 27 includes the video encoders 1 and 2'. Receiving the video signals V1 and V1', the encoder device 27 produces digital data trains V2 and V2'. The encoder device 27 outputs those data trains V2 and V2' to the information supplying device 28.

The information supplying device 28 of the present embodiment is the same as that of the fifth embodiment except for the following points.

The information supplying device 28 is provided with two input interfaces, that is, a first input interface 29 and a second input interface 30, and two auxiliary memory controllers, that is, a first auxiliary memory controller 32a and a second auxiliary memory controller 32b. The information supplying device 28 is further provided with a video buffer memory 37 and another video buffer memory 38'. The first and second input interfaces 29 and 30, the input/output controller 31, the first and second auxiliary memory controllers 32a and 32b, the modem 35, the video buffer memory 37, and the video buffer memory 38' are all connected via the bus line 39 with one another. A first auxiliary memory 11a is connected to the first auxiliary memory controller 32a. Second auxiliary memories 11b are connected to the second auxiliary memory controller 32b. The video buffer memory 37 and the video buffer memory 38' are connected to the video packetizers 5 and the video packetizer 6', respectively. The multiplexer 9 is connected to both the video packetizer 5 and the video packetizer 6'. The output interface 33 is connected to both the multiplexer 9 and the head amplifier 34.

The first input interface 29 is for receiving the digital data train V2 from the video encoder 1, and the second input interface 30 is for receiving the digital data train V2' from the video encoder 2'.

The first memory controller 32a can be controlled by the input/output controller 31 to write data to and read data from the first auxiliary memory 11a. The second memory controller 32b can be controlled by the input/output controller 31 to write data to and read data from the second auxiliary memories 11b.

The input/output controller 31 controls the first auxiliary memory controller 32a to write into the memory 11a the digital data train V2 inputted at the first input interface 29. The input/output controller 31 controls the second auxiliary memory controller 32b to write into the memories 11b the digital data train V2' inputted at the second input interface 30.

When the head amplifier 34 receives a request for certain information, the input/output controller 31 controls the memory controllers 32a and 32b to read out, from the memories 11a and 11b, the digital data train V2 and the digital data train V2' of the requested information.

The video buffer memory 37 and the video buffer memory 38' are respectively for temporarily storing the digital data train V2 and the digital data train V2' thus read out from the memories 11a and 11b. The video packetizer 5 is for converting the digital data train V2 into a packet data train V3. The video packetizer 6' is for converting the digital data train V2' into a packet data train V3'.

The multiplexer 9 is for composing the packet data trains V3 and V3' outputted from the packetizers 5 and 6' into a single packet data train VV. The output interface 33 is for transferring the composite packet data train VV from the multiplexer 9 to the head amplifier 34, from which the composite packet data train VV is transmitted to the transmission line 7.

The structure of the terminal 36 of the sixth embodiment is the same as that shown in FIG. 9.

With the above-described structure, information is stored into the device 28 in the following manner.

A set of video signals V1 is inputted to the video encoder 1, where the video signal set V1 is converted into a digital data train V2. The digital data train V2 is then inputted to the first input interface 29.

Another set of video signals V1' is inputted to the video encoder 2', where the video signal set V1' is converted into another digital data train V2'. The digital data train V2' is then inputted to the second input interface 30.

The thus inputted digital data train V2 is then stored into the first auxiliary memory 11a by the first auxiliary memory controller 32a. Similarly, the digital data train V2' is stored into the second auxiliary memory 11b by the second auxiliary memory controller 32b.

The information supplying device 28 supplies information to the terminal 36 in the following manner.

When the terminal 36 transmits a request to the information supplying device 28 via the transmission line 7, the request is inputted to the input/output controller 31 via the head amplifier 34 and the modem 35. The input/output controller 31 controls the controllers 32a and 32b to read out, from the memories 11a and 11b, digital data trains V2 and V2' representative of the requested information.

The digital data trains V2 and V2' are temporarily stored in the buffers 37 and 38', respectively. The digital data train V2 is then outputted to the video packetizer 5, where the data train is converted into a packet data train V3. Similarly, the digital data train V2' is outputted to the video packetizer 6', where the data train V2' is converted into another packet data train V3'. These packet data trains V3 and V3' are then combined into a single packet data train VV in the multiplexer 9. The packet data train VV is then transmitted via the output interface 33 and the head amplifier 34 to the terminal 36 that has requested the transmission of the information.

Thus, the requested information is transmitted to the terminal 36. In the terminal 36, the received packet data train VV is processed in the same manner as in the fifth embodiment.

Next will be described how karaoke information is stored into the information supplying device 28 of the present embodiment.

In the fifth embodiment, a set of background image signals V1 and a set of lyric image signals V1' are prepared for each song, combined into a packet data train VV, and stored in the memories 11. It is noted that each lyric image set is used exclusively for its corresponding karaoke song. However, each background image set can be used for several karaoke songs of the same genre. It is therefore unnecessary that a set of background image signals V1 be prepared for each song.

Accordingly, in the present embodiment, a set of video signals V1' indicative of lyric images is prepared for each song and stored in the device 28. However, a set of video signals V1 indicative of background images is not prepared for each song. Instead, several sets of background video signals V1 are prepared for each genre of karaoke songs. Each set of background video signals V1 will therefore be used for a plurality of songs belonging to the same corresponding genre. In other words, each set of video signals V1 will be combined with a plurality of sets of lyric image signals V1' of the corresponding genre.

According to the present embodiment, the background video signals V1 and the lyric video signals V1' are stored separately in the memories 11a and 11b in the form of digital data trains V2 and V2'. When a certain song is requested, the lyric video data train V2' for the requested song is retrieved from the memory 11b. The background video data train V2 for a genre, to which the requested song belongs, is retrieved from the memory 11a. The retrieved signals V2 and V2' are composed into a single packet data train VV before being transmitted to the requesting terminal 36.

FIGS. 12(A) through 12(D) illustrate how one set of background video signals V1 can be used for several, three, in this case, karaoke songs "a", "b", and "c" of a corresponding genre.

FIG. 12(A) shows one set of background video signals V1 suited for a certain song genre. The set of video signals V1 is converted into a digital data train V2 and stored in the memory 11a. When a song, belonging to a genre of the background video signals V1, is requested, the digital data train V2 will be retrieved from the memory 11a and converted into a packet data train V3. The packet data train V3 is constructed from six packets of data: PV(1), PV(2), PV(3), PV(4), PV(5), and PV(6).

FIGS. 12(B) through 12(D) respectively show three sets of lyric video signals V1'a, V1'b, and V1'c for three different karaoke songs "a," "b," and "c" that belong to the song genre suited for the background video signals V1 of FIG. 12(A).

As shown in FIG. 12(B), the set of video signals V1'a is converted into a digital data train V2'a and stored in the memory 11b. When the song "a" is requested, the digital data train V2'a will be retrieved from the memory 11b and converted into a packet data train V3'a. The packet data train V3'a is constructed from three packets of data: PV'a(1), PV'a(2), and PV'a(3).

Similarly, as shown in FIGS. 12(C) and 12(D), the sets of video signals V1'b and V1'b are converted into digital data trains V2'b and V2'c and stored in the memory 11b. When the songs "b" and "c" are requested, the digital data trains V2'b and V2'c will be retrieved from the memory 11b and converted into packet data trains V3'b and V3'c. The packet data train V3'b is constructed from three packets of data: PV'b(1), PV'b(2), and PV'b(3). Similarly, the packet data train V3'c is constructed from three packets of data: PV'c(1), PV'c(2), and PV'c(3).

It is assumed that a user at the terminal 36 requests a karaoke song "a". In this case, the digital data train V2'a is retrieved from the memory 11b. The data train V2'a is converted into the packet data train V3'a and outputted to the multiplexer 9. Because the set of background video signals V1 corresponds to the genre to which the requested song "a" belongs, the corresponding digital data train V2 is retrieved from the memory 11a and converted into the packet data train V3. The packet data train V3 is outputted to the multiplexer 9. The multiplexer 9 then composes the packet data trains V3'a and V3 into a single packet data train VV'a shown in FIG. 13(A) where the packets PV(1), PV(2), PV'a(1), PV(3), PV(4), PV'a(2), PV(5), PV(6), and PV'a(3) are arranged in the order listed. The thus composed packet data train is transmitted to the terminal 36.

Similarly, when another karaoke song "b" is requested, the packet data trains V3 and V3'b are composed into a single packet data train VV'b shown in FIG. 13(B) where the packets PV(1), PV(2), PV'b(1), PV(3), PV(4), PV'b(2), PV(5), PB(6), and PV'b(3) are arranged in the order listed. When still another karaoke song "c" is requested, the packet data trains V3 and V3'c are composed into a single packet data train VV'c shown in FIG. 13(C) where the packets PV(1), PV(2), PV'c(1), PV(3), PV(4), PV'c(2), PV(5), PV(6), and PV'c(3) are arranged in the order listed.

Thus, according to the present embodiment, the background data train V2 shown in FIG. 12(A) is stored in the first auxiliary memory 11a. The lyric data trains V2'a, V2'b, and V2'c shown in FIGS. 12(B) through 12(D) are stored in the second auxiliary memory 11b. The background data train V2 and the lyric data trains V2'a, V2'b, and V2'c are thus stored separately in the information supplying device 28. However, when the song "a" is requested at a terminal, the data trains V2 and V2'a are composed into a single data train VV'a and outputted to the terminal 36. When the song "b" is requested at a terminal, the data trains V2 and V2'b are composed into a single data train VV'b and outputted to the terminal 36. When the song "c" is requested at a terminal, the data trains V2 and V2'c are composed into a single data train VV'c and outputted to the terminal 36.

If the information is stored in the information supplying device 28 in the form of the composite packet data trains as in the fifth embodiment, the composite packet data trains VV'a, VV'b, and VV'c shown in FIGS. 13(A) through 13(C) have to be stored in the memories 11. It is noted, however, that every composite packet train VV'a, VV'b, and VV'c includes the same packets PV(1), PV(2), PV(3), PV(4), PV(5), and PV(6). Thus, the same packets PV(1), PV(2), PV(3), PV(4), PV(5), and PV(6) are stored in triplicate in the memories 11.

Contrarily, according to the present embodiment, the background video data V2 are not stored in triplicate. The storage capacity of the memories 11a and 11b can therefore be made smaller than the memories 11 in the fifth embodiment.

It is now assumed that the information supplying device 28 is desired to be capable of supplying 10,000 karaoke songs. The karaoke songs are now divided into two genres: Japanese "enka" songs and "pops" songs. 10,000 sets of lyric image signals V1' are stored in the second auxiliary memories 11b in the form of digital data trains V2'. On the other hand, only 100 sets of "enka" background video signals V1 and 100 sets of "pops" video signals V1 are prepared and stored in the first auxiliary memory 11a in the form of digital data trains V2. It is unnecessary to prepare and store 10,000 sets of background video signals V1. The storage capacity of the memory 11a can be made as small as 1/50 of the case when 10,000 sets of video signals V1 are stored as in the fifth embodiment.

Thus, the total amount of data stored in the memories 11a can be minimized. Still, the information supplying device 28 can supply background images suited for the user's selected songs similarly as in the fifth embodiment.

The information supplying device 28 of the present embodiment stores movie information in the following manner.

In the fifth embodiment, when information of each movie is stored in the information supplying device 28, a set of movie image signals V1 and a set of movie subtitle image signals V1' are prepared for each movie, and stored in the information supplying device 28. However, in the present embodiment, several sets of movie subtitle image signals V1' are prepared in several languages for each movie. The set of movie image signals V1 and the corresponding several-sets of movie subtitle image signals V1' are stored in the memories 11a and 11b, respectively, in the forms of digital data trains V2 and V2'.

A user at the terminal 36 can request supply of a certain movie in a certain language. The input/output controller 31 reads out from the memory 11a a requested set of movie image data V2. The input/output controller 31 reads out from the memory 11b a set of movie subtitle image data V2' in the requested language. The multiplexer 9 will combine those data and output the information to the terminal 36.

It is noted that in the same manner as described above, several sets of lyric image data V2' may be prepared and stored in several languages for each karaoke song. When a user at the terminal requests a supply of a karaoke song in a certain language, the input/output controller 31 reads out from the memory 11a a set of background image data V2 of a genre, to which the requested song belongs. The input/output controller 31 reads out from the memory 11b a set of lyric image data V2' in the requested language. The multiplexer 9 will combine those data and output the information to the terminal 36.

A seventh embodiment will be described below with reference to FIG. 14.

In the sixth embodiment, video signals V1 and V1' are converted into digital data trains V2 and V2', and then stored in the memories 11a and 11b. However, in the present embodiment, the digital data trains V2 and V2' are further converted into packet data trains V3 and V3' before being stored into the memories 11a and 11b.

Figure 14:
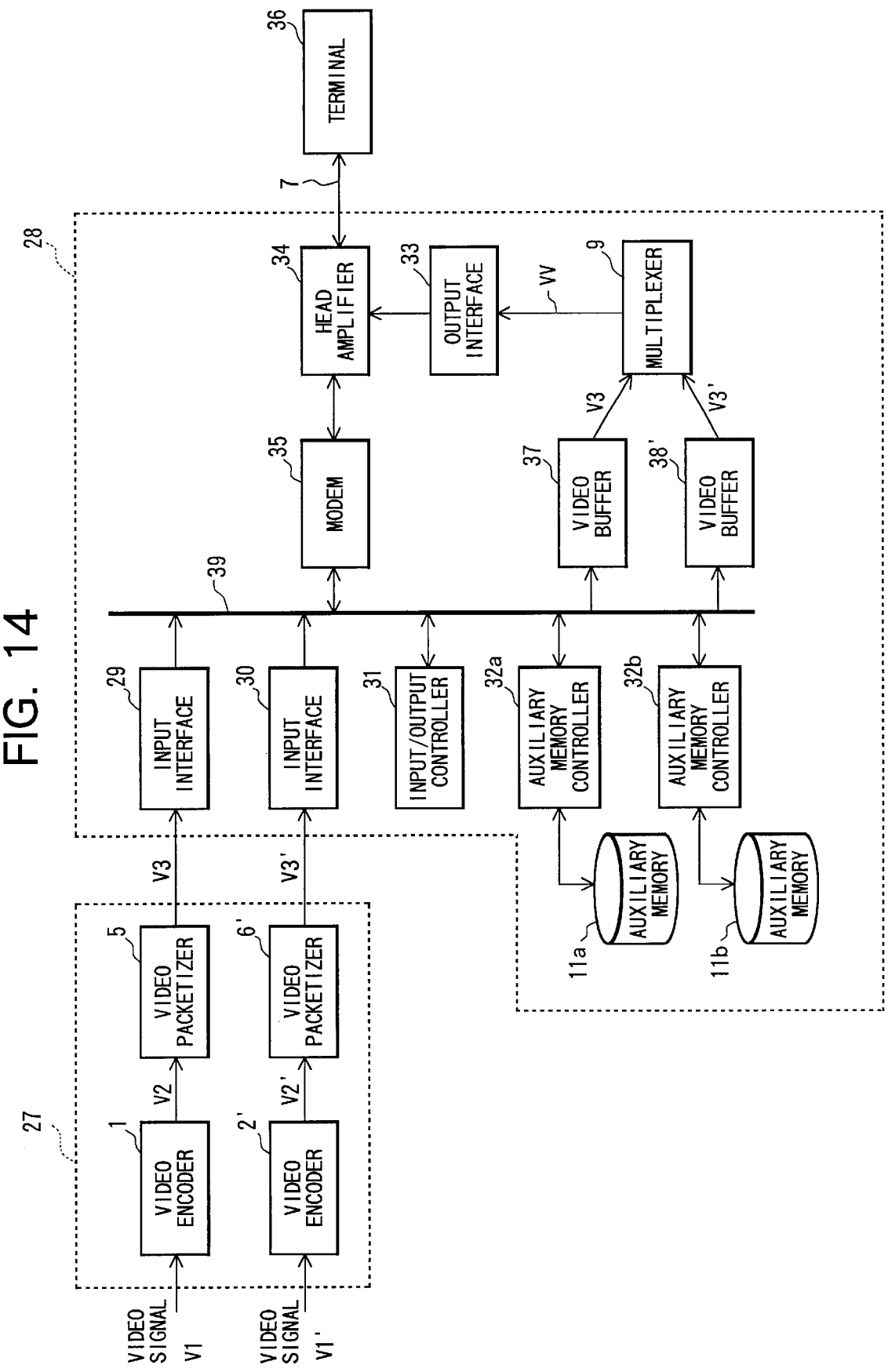
FIG. 14 is a block diagram schematically showing a structure of a video server system according to a seventh embodiment of the present invention.

FIG. 14 shows a video server system in which the information supplying device 28 of the seventh embodiment is connected to one or more terminals 36 via the transmission line 7. The information supplying device 28 is connected to the encoder device 27 at least when information is stored into the device 28.

The information supplying device 28 of the present embodiment is the same as the information supplying device 28 of the sixth embodiment except that the device 28 of the present embodiment is not provided with the video packetizers 5 and 6'. Instead, the packetizers 5 and 6' are provided to the encoder device 27. The video packetizer 5 is connected to the video encoder 1, and the video packetizer 6' is connected to the video encoder 2'.

With this structure, a set of video signals V1 is converted into a digital data train V2 by the video encoder 1. The digital data train V2 is further converted into a packet data train V3 by the video packetizer 5. The packet data train V3 is inputted through the first input interface 29 into the first auxiliary memory 11a.

Similarly, another set of video signals V1' is converted into a digital data train V2' by the video encoder 2'. The digital data train V2' is further converted into a packet data train V3' by the video packetizer 6'. The packet data train V3' is inputted through the second input interface 30 into the second auxiliary memory 11b.

When transmission is requested by the terminal 36, the packet data trains V3 and V3' are read out of the memories 11a and 11b. The packet data train V3 is temporarily stored in the video buffer memory 37, and the packet data train V3' is temporarily stored in the video buffer memory 38'. The packet data trains are then outputted to the multiplexer 9. The packet data trains V3 and V3' are composed into a single packet data train VV by the multiplexer 9 and transmitted to the terminal 36 via the output interface 33 and the head amplifier 34.

In the above-described fifth through seventh embodiments, lyric image information is prepared in video signals and stored in video data format. However, the lyric image information can be stored in the form of text code data representative of characters and symbols. The terminal 36 will reproduce the supplied lyric data and then superimpose the reproduced lyric data onto the video signals of the background images. Movie subtitle image information can also be prepared and stored in text code data.

An eighth embodiment will be described below with reference to FIG. 15.

According to the present embodiment, the encoder device 27 includes a video encoder 1, an audio encoder 2, and another video encoder 2'. The video encoder 1 is for receiving video signals V1 and for outputting a digital data train V2. The audio encoder 2 is for receiving audio signals A1 and for outputting a digital data train A2. The video encoder 2' is for receiving video signals V1' and for outputting a digital data train V2'.

The information supplying device 28 includes three interfaces 29, 30, and 30' for receiving the data trains V2, A2, and V2', respectively. The data trains V2, A2, and V2' are written into auxiliary memories 11a, 11b, and lid under control by auxiliary memory controllers 32a, 32b, and 32d. The information supplying device 28 further includes: three buffers, that is, a video buffer 37, an audio buffer 38, and another video buffer 38'; and three packetizers, that is, a video packetizer 5, an audio packetizer 6, and another video packetizer 6'. The multiplexer 9 is connected to all the packetizers 5, 6, and 6'.

Except for the above-described points, the structure of the information supplying device 28 is the same as those of the second and sixth embodiments.

When certain information is requested by the terminal 36 having the structure shown in FIG. 2, a data train V2 for the requested information is retrieved from the memory 11a, temporarily stored in the video buffer memory 37, and packetized into a data train V3 by the video packetizer 5. A data train A2 for the requested information is retrieved from the memory 11b, temporarily stored in the audio buffer memory 38, and packetized into a data train A3 by the audio packetizer 6. A data train V2' for the requested information is retrieved from the memory 11d, temporarily stored in the video buffer memory 38', and packetized into a data train V3' by the video packetizer 6'. The data trains V3, A3, and V3' are composed by the multiplexer 9 into a composite data train VAV and transmitted to the terminal 36.

Figure 10:
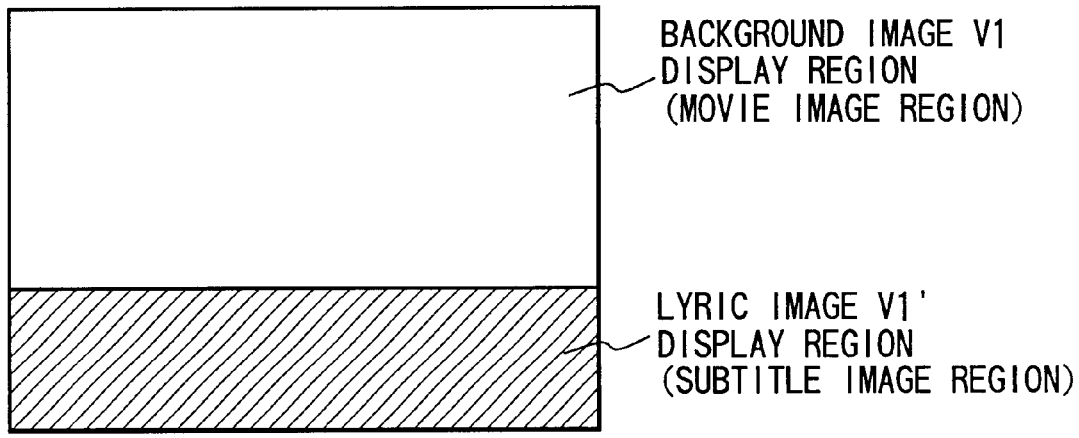
FIGS. 10(A) and 10(B) illustrate examples showing how background image data and lyric image data are displayed on a single screen.
Figure 10:
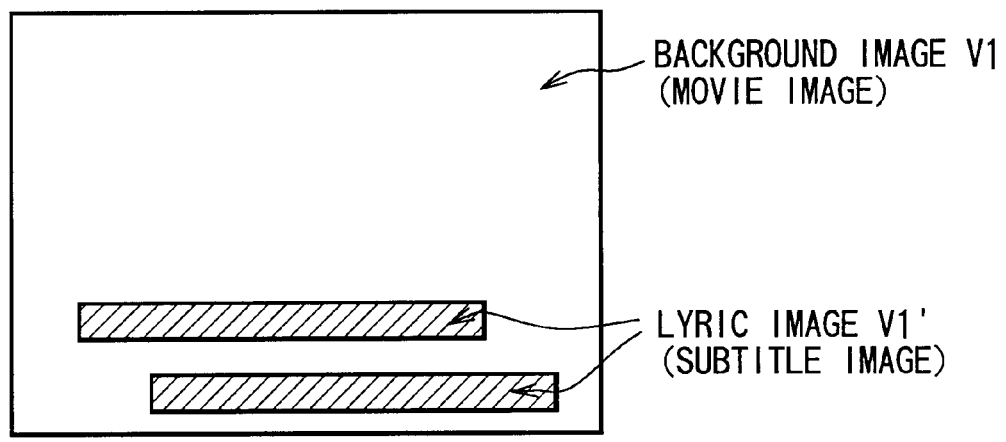

The terminal 36 has the structure the same as shown in FIG. 2. In the terminal 36, the system decoder 58 divides the composite data train VAV into the audio packet data train A2 and a video packet data train V4. The audio decoder 60 converts the data train A2 into the analog audio signals A1 and supplies the signals A1 to the amplifier 47. The video decoder 59 converts the data train V4 into analog video signals V5 and supplies the signals V5 to the monitor television 53. The video signals V5 are composed by the original video signals V1 and V1'. The video signals V5 are supplied to the monitor television 53. The monitor television 53 displays a composite image of the video signals V1 and V1' as shown in FIG. 10 (A) or 10(B), for example.

In order store karaoke information in the device 28, a set of accompaniment music signal A1 is prepared for each song, converted into a data train A2, and stored in the memory 11b. A set of lyric image signal V1' is prepared for each song, converted into a data train V2', and stored in the memory 11d. A set of background image signal V1 is prepared for each genre, converted into a data train V2, and stored in the memory 11a.

When one song is requested at the terminal 36, the accompaniment music data train A2 for the requested song is retrieved from the memory 11b. The lyric image data train V2' for the requested song is retrieved from the memory 11c. The background image data train V2 for a genre, to which the requested song belongs, is retrieved from the memory 11a. The retrieved data trains A2, V2', and V2 are converted into packet data trains A2, V3', and V3, composed into a composite data train VAV, and transmitted to the terminal 36. In the terminal 36, the monitor television 36 displays the composite image of the background image and the lyric image while the speaker 49 outputs the accompaniment music.

In order store movie information in the device 28, several sets of movie sound signals A1 are prepared in several languages for each movie, converted into a data train A2, and stored in the memory 11b. Several sets of movie subtitle image signals V1' are prepared in several languages for each movie, converted into several data trains V2', and stored in the memory 11d. A set of movie image signal V1 is prepared for each movie, converted into a data train V2, and stored in the memory 11a.

When one movie is requested in a certain language at the terminal 36, an image sound data train A2 for the requested movie in the requested language is retrieved from the memory 11b. A subtitle image data train V2' for the requested movie in the requested language is retrieved from the memory 11c. The movie image data train V2 for the requested movie is retrieved from the memory 11a. The retrieved data trains A2, V2', and V2 are converted into packet data trains A3, V3', and V3, composed into a composite data train VAV, and transmitted to the terminal 36. In the terminal 36, the monitor television 36 displays the composite image of the movie image and the subtitle image while the speaker 49 outputs the movie sound.

As described above, according to the information supplying device of the present invention, the information storing unit stores at least one kind of first information and at least one kind of second information. The first information is capable of being combined with the second information. The composing unit composes the first information and the second information read out from the information storing unit. The supplying unit supplies the composite information to an information output device.

Preferably, the information storing unit includes a first area for storing the first information and a second area for storing the second information. Or, the information storing unit includes a first storing unit for storing the first information and a second storing unit for storing the second information.

Preferably, the information storing unit stores the first information and the second information in the form of digital data trains. In the composing unit, the packetlzing unit converts the digital data trains of the first and second information read out from the information storing means into packet data trains. The packet composite unit composes the packet data trains into a single packet data train. The supplying unit supplies the single packet data train to the information output device.

Or, the information storing unit may store the first and second information in the form of packet data trains. The composing unit composes the packet data trains of the first and second information read out from the information storing unit into a single packet data train. The supplying unit supplies the single packet data train to the information output device.

The first information may include image information, and the second information may include sound information. For example, the first information may include background image information, and the second information may include accompaniment music sound information.

Or otherwise, the first information may include a kind of image information, and the second information includes another kind of image information.

The information output device may display the composite first and second image information on a single screen. In this case, the composing unit may compose the first and second image information in a manner that the information output device displays the first and second image information in predetermined different regions on the single screen. Or otherwise, the composing unit may compose the first and second image information in a manner that the information output device displays the first and second image information in a manner that the first and second image information at least partly overlap on each other. In this case, the composing unit may give priority to the second image information. The composing unit may therefore compose the first and second image information in a manner that the information output device displays the second image information over the first image information when the first and second image information overlap on each other.

The second image information may be constructed from text code data representative of characters and symbols. The first image information is constructed from an image-compressed digital code data.

While the invention has been described in detail with reference to specific embodiments thereof, it would be apparent to those skilled in the art that various changes and modifications may be made therein without departing from the spirit of the invention.

For example, in the above-described first through fourth embodiments, image information and music information is combined and supplied to the terminal. In the fifth through seventh embodiments, image information and another image information is combined and supplied to the terminal. In the eighth embodiment, image information, sound information, and another image information is combined and supplied to the terminal. However, other various types of information can be combined and supplied to the terminal. For example, two or more kinds of sound information can be combined and supplied to the terminal.

What is claimed is:

1. An information supplying device for supplying information to an information output device for outputting information, the information supplying device comprising:

an information storing unit that stores at least one set of first information and a plurality of sets of second information, each set of first and second information including a set of digital data, the plurality of sets of second information being stored separately from the at least one set of first information;

an input unit that receives a request to supply desired information from the information output device;

a read unit, in response to the received request, that reads, from the information storing unit, one set of second information that corresponds to the desired information and one set of first information that corresponds to either one of the desired information and the read set of second information;

a composing unit that composes the one set of first information and the one set of second information read out from the information storing unit, the composing unit composing the one set of first information, in the form of a packet data train, with the one set of second information in the form of another packet data train, thereby forming a single composite packet data train; and a supplying unit that supplies the composed information in the form of the single composite packet data train to an information output device;

wherein the information storing unit stores the at least one set of first information and the plurality of sets of second information, each set of the at least one set of first information being prepared to be combined with several sets of second information, and a total number of sets of second information is greater than a total number of sets of first information, wherein the information storing unit stores the first information and the second information in the form of digital data trains, and wherein the composing unit includes:
  a packetizing unit that converts the digital data trains of the first and second information read out from the information storing unit into packet data trains; and
  a packet composite unit that composes the packet data trains into the single composite packet data train, in which data packets of the first information and data packets of the second information are mixed together, the supplying unit supplying the single composite packet data train to the information output device.

2. An information supplying device as claimed in claim 1, wherein the information storing unit includes:
   a first area for storing the first information; and
   a second area for storing the second information.

3. An information supplying device as claimed in claim 1, wherein the information storing means includes:
   first storing unit for storing the first information; and
   second storing for storing the second information.

4. An information supplying device as claimed in claim 1, wherein the first information includes image information, and the second information includes sound information.

5. An information supplying device as claimed in claim 4, wherein the first information includes background image information, and the second information includes accompaniment music sound information.

6. An information supplying device as claimed in claim 1, wherein the first information includes a kind of image information, and the second information includes another kind of image information.

7. An information supplying device as claimed in claim 6, wherein the information output device displays the composite first and second image information on a single screen, and wherein the composing unit composes the first and second image information in a manner that the information output device displays the first and second image information in predetermined different regions on the single screen.

8. An information supplying device as claimed in claim 6, wherein the information output device displays the composite first and second image information on a single screen, and wherein the composing unit composes the first and second image information in a manner that the information output device displays the first and second image information in a manner that the first and second image information at least partly overlap on each other.

9. An information supplying device as claimed in claim 8, wherein the composing unit includes priority giving unit for giving priority to the second image information, the composing unit composing the first and second image information in a manner that the information output device displays the second image information over the first image information when the first and second image information overlap on each other.

10. An information supplying device as claimed in claim 6, wherein the second image information is constructed from text code data representative of characters and symbols.

11. An information supplying device as claimed in claim 6, wherein the first image information is constructed from an image-compressed digital code data.

12. An information supplying device as claimed in claim 6, wherein the plurality of sets of second image information includes a plurality of sets of lyric image information of a plurality of karaoke songs, each of which belongs to either one of several genres, and wherein the at least one set of first image information includes a plurality of sets of background image information, each set of background image information being for a corresponding one of the several genres of the plurality of karaoke songs,
   wherein the input unit receives a request for a desired song,
   wherein the read unit reads, from the information storing unit, one set of lyric image information that corresponds to the desired song and one set of background image information that corresponds to a genre, to which the desired song belongs.

13. An information supplying device as claimed in claim 6, wherein each set of the at least one set of first information includes a set of movie image data, and wherein the plurality of sets of second information includes several sets of subtitle image data in several languages in correspondence with each set of the movie image data,
   wherein the input unit receives a request for a desired movie in a desired language,
   wherein the read unit reads from the information storing unit, one set of movie image data that corresponds to the desired movie and one set of subtitle image data that corresponds to the desired movie and to the desired language.

14. An information supplying device for supplying information to an information output device for outputting information, the information supplying device comprising:
   a first information storing unit that stores first information;
   a second information storing unit that stores second information;
   an input unit that receives a request to supply desired information from the information output device and, upon receiving the request, that reads desired second information from the second information storing unit and that reads corresponding first information from the first information storing unit;
   a composing unit that composes the first information read out from the first information storing unit and the second information read out from the second information storing unit; and
   a supplying unit that supplies the composed first and second information to an information output device,
   wherein the second information storing unit stores a plurality of sets of second data, each set of second data including a set of digital data, and wherein the first information storing unit stores a plurality of sets of first data, each set of first data including another set of digital data, each set of first data being prepared to be combined with one or more sets of second data, the composing unit composing a certain set of first data in the form of a packet data train and one of the corresponding one or more sets of second data in the form of another packet data train, thereby producing a single packet data train, the supplying unit supplying the composite packet data train to the information output device, and a total number of sets of second information is greater than a total number of sets of first information,
   wherein the first information storing unit stores the plurality of sets of first data in the form of a plurality of first digital data trains, wherein the second information storing unit stores the plurality of sets of second data in the form of a plurality of second digital data trains, and
   wherein the composing unit includes:
      a packetizing unit that converts a first digital data train read out from the first information storing unit into a first packet data train, in which several first data packets are arranged, and that converts a second digital data train read out from the second information storing unit into a second packet data train, in which several second data packets are arranged; and
      a packet composite unit that composes the first packet data train and the second packet data train into a single packet data train, in which the first and second data packets are mixed together, the supplying unit supplying the single packet data train to the information output device.

15. An information supplying device as claimed in claim 1, wherein the composing unit composes, into a packet data train, the one set of first information and the one set of second information read out from the information storing unit, the supplying means supplying the composite information in the form of the packet data train to the information output devices.

16. An information supplying device as claimed in claim 1, wherein the information storing unit stores a plurality of sets of first information and a plurality of sets of second information, the plurality of sets of second information corresponding to information to be requestable by requests inputtable to the input unit, each set of first information indicating information corresponding in common to several sets of second information, wherein when the input unit receives a request to supply desired information, the read unit reads, from the information storing unit, one set of second information that corresponds to the desired information and one set of first information that corresponds to the read set of second information.

17. An information supplying device as claimed in claim 16, wherein the plurality of sets of second information include a plurality of sets of accompaniment music data of a plurality of karaoke songs, each of which belongs to either one of several genres, and wherein the plurality of sets of first information include a plurality of sets of background image data, each set of background image data being for a corresponding one of the several genres of the plurality of karaoke songs, wherein when the input unit receives a request for a desired song, the read unit reads, from the information storing unit, one set of accompaniment music data that corresponds to the desired song and one set of background image data that corresponds to a genre, to which the desired song belongs.

18. An information supplying device as claimed in claim 16, wherein the plurality of first information include a plurality of sets of movie image data, and wherein the plurality of sets of second information include several sets of movie sound data in several languages in correspondence with each set of the movie image data, wherein when the input unit receives a request for a desired movie in a desired language, the read unit reads, from the information storing unit, one set of movie image data that corresponds to the desired movie and one set of movie sound data that corresponds to the desired movie and to the desired language.

19. An information supplying device as claimed in claim 16, wherein the information storing unit further stores a plurality of sets of third information in one to one correspondence with the plurality of sets of second information, each set of first information indicating information corresponding in common to several sets of second information and in common to corresponding several sets of third information, wherein when the input unit receives a request to supply desired information, the read unit reads, from the information storing unit, one set of second information and one set of third information that correspond to the desired information and one set of first information that corresponds to the read set of second information and the read set of third information.

20. An information supplying device as claimed in claim 19, wherein the plurality of sets of second information include a plurality of sets of accompaniment music data of a plurality of karaoke songs, each of which belongs to either one of several genres, wherein the plurality of sets of third information include a plurality of sets of lyric image data of the plurality of karaoke songs, and wherein the plurality of sets of first information include a plurality of sets of background image data, each set of background image data being for a corresponding one of the several genres of the plurality of karaoke songs, wherein when the input unit receives a request for a desired song, the read means reads, from the information storing unit, one set of accompaniment music data that corresponds to the desired song, one set of lyric image data that corresponds to the desired song, and one set of background image data that corresponds to a genre, to which the desired song belongs.

21. An information supplying device as claimed in claim 6, wherein the plurality of sets of second image information includes a plurality of sets of lyric image information for a plurality of karaoke songs in several languages, each karaoke song belonging to either one of several genres, and wherein the at least one set of first image information includes a plurality of sets of background image information, each set of background image information being for a corresponding one of the several genres of the plurality of karaoke songs, wherein the input unit receives a request for a desired song in a desired language, wherein the read unit reads, from the information storing unit, one set of lyric image information that corresponds to the desired song of the desired language and one set of background image information that corresponds to a genre, to which the desired song belongs.

22. An information supplying device as claimed in claim 14, further comprising:

a receiving unit that receives a request for desired information; and a reading unit that reads, from the second information storing unit, one set of second data that corresponds to the desired information; and the reading unit that reads, from the first information storing unit, one set of first data that is capable of being combined with the read set of first data, wherein the composing unit composes the read set of first data and the read set of second data, and the supplying unit supplies the composite first and second data to the information output device.

23. An information supplying device for supplying information to an information output device for outputting information, the information supplying device comprising:

an information storing unit that stores at least one set of first information and a plurality of sets of second information, each set of first information including a set of digital data and each set of second information including another set of digital data, the plurality of sets of second information being stored separately from the at least one set of first information, each set of the at least one set of first information being prepared to be combined with one or more sets of second information, and a total number of sets of second information is greater than a total number of sets of first information;

an input unit that receives a request to supply desired information from the information output device;

a read unit, in response to the request, that reads, from the information storing unit, one set of second information that corresponds to the desired information and one set of first information that corresponds to the read set of second information, the reading unit reading the one set of second information in the form of a packet data train, in which several data packets of the second information are arranged and the one set of first information also in the form of another packet data train, in which several data packets of the first information are arranged;

a composing unit that composes the one set of first information in the form of the packet data train and the one set of second information in the form of the other packet data train into a single packet data train, in which the data packets of the first information and data packets of the second information are mixed together; and a supplying unit that supplies the composite information in the form of the single packet data train to an information output device, wherein the information storing unit stores the at least one set of first information and the plurality of sets of second information in the form of digital data trains, and wherein the read unit includes:
 a packetizing unit that converts the digital data train of the second information read out from the information storing unit into the packet data train, and that converts the digital data train of the first information read out from the information storing unit into the other packet data train.

24. An information supplying device for supplying information to an information output device for outputting information, the information supplying device comprising:

a first information storing unit that stores a plurality of sets of first data, each set of first data including a set of digital data;

a second information storing unit that stores a plurality of sets of second data, each set of second data including another set of digital data, each set of first data being prepared to be combined with one or more sets of second data, and a total number of sets of second data is greater than a total number of sets of first data;

a receiving unit that recieves a request for desired information from the information output device;

a first read unit that reads, from the second information storing unit, a set of second data that corresponds to the desired information, the reading unit reads the set of second data in the form of a packet data train, in which data packets for the second data are arranged;

a second read unit that reads, from the first information storing unit, a set of first data that is prepared to be combined with the read set of second data, the reading unit reading the set of first data in the form of another packet data train, in which data packets for the first data are arranged;

a composing unit that composes the second data set read out from the second information storing unit in the form of the packet data train and the first data set read out from the first information storing unit in the form of the other packet data train into a single packet data train in which the data packets for the first data and the data packets for the second data are mixed together; and a supplying unit that supplies the composite first and second data sets in the form of the single packet data train to an information output device, wherein the first information storing unit stores the plurality of sets of first data in the form of a plurality of distal data trains, and the second information storing unit stores the plurality of sets of second data in the form of another plurality of digital data trains, wherein the first read unit includes a first packetizing unit that converts a digital data train of the second data read out from the second information storing unit into the packet data train, and wherein the second read unit includes a second packetizinz unit that converts another digital data train of the first data read out from the first information storing unit into the other packet data train.

25. An information supplying device as claimed in claim 1, wherein the packetizing unit includes:

a first packetizing unit that converts the digital data train of the first information into a first packet data train, in which data packets of the first information are arranged; and a second packetizing unit that converts the digital data train of the second information into a second packet data train, in which data packets of the first information are arranged, the packet composite unit composing the first and second packet data trains into the single composite packet data train.

26. An information supplying device as claimed in claim 14, wherein the packetizing unit includes:

a first packetizing unit that converts the first digital data train into the first packet data train; and a second packetizing unit that converts the second digital data train into the second packet data train, the packet composite unit composing the first and second packet data trains into the single packet data train.

27. An information supplying device as claimed in claim 23, wherein the packetizing unit includes:

a packetizing unit that converts the digital data train of the second information into the packet data train; and another packetizing unit that converts the digital data train of the first information into the other packet data train, the packet composite unit composing the packet data trains into the single packet data train.

* * * * *